(12) United States Patent
Cho et al.

(10) Patent No.: US 10,552,696 B2
(45) Date of Patent: Feb. 4, 2020

(54) ELECTRONIC DEVICE HAVING A BIOMETRIC SENSOR

(71) Applicant: Samsung Electronics Co., Ltd., Suwon-si, Gyeonggi-do (KR)

(72) Inventors: Joungmin Cho, Seoul (KR); Soohyung Kim, Hwaseong-si (KR); Taesung Kim, Suwon-si (KR); Hyunchang Shin, Seongnam-si (KR); Songhee Jung, Suwon-si (KR); Jiwoong Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 38 days.

(21) Appl. No.: 15/839,035

(22) Filed: Dec. 12, 2017

(65) Prior Publication Data

US 2018/0165533 A1    Jun. 14, 2018

(30) Foreign Application Priority Data

Dec. 12, 2016  (KR) .......................... 10-2016-0168674

(51) Int. Cl.
 *G06K 9/00* (2006.01)
 *G02F 1/136* (2006.01)
 (Continued)

(52) U.S. Cl.
 CPC ......... *G06K 9/00885* (2013.01); *G02F 1/136* (2013.01); *G06F 3/042* (2013.01);
 (Continued)

(58) Field of Classification Search
 CPC ......... G02F 1/136; G02F 2001/133521; G06F 3/0412; G06F 3/042; G06K 9/0004;
 (Continued)

(56) References Cited

U.S. PATENT DOCUMENTS

| 6,989,826 B2 * | 1/2006 | Kasai | ..................... G09G 3/325 |
| | | | 315/169.1 |
| 8,314,782 B2 * | 11/2012 | Ino | ..................... G02F 1/133526 |
| | | | 345/175 |

(Continued)

FOREIGN PATENT DOCUMENTS

| CN | 105334657 A | 2/2016 |
| EP | 3173973 A1 | 5/2017 |

(Continued)

OTHER PUBLICATIONS

European Search Report dated May 2, 2018, issued in European Patent Application No. 17206822.3.

*Primary Examiner* — Bhavesh M Mehta
*Assistant Examiner* — Ian L Lemieux
(74) *Attorney, Agent, or Firm* — Jefferson IP Law, LLP

(57) ABSTRACT

An electronic device having a biometric sensor is provided. The electronic device includes a first region including a plurality of first pixels arranged in a first manner and a second region including a plurality of second pixels arranged in a second manner, a biometric sensor disposed in at least a part of the first region, and a processor electrically coupled with the display and the biometric sensor, and configured to receive a user input through the first region, and control the biometric sensor to detect biometric information corresponding to the user input.

18 Claims, 16 Drawing Sheets

(51) Int. Cl.
*G06F 3/042* (2006.01)
*G06K 9/20* (2006.01)
*G06K 9/46* (2006.01)
*G09G 5/00* (2006.01)
*G02F 1/1335* (2006.01)

(52) U.S. Cl.
CPC ......... *G06K 9/2027* (2013.01); *G06K 9/4604* (2013.01); *G09G 5/003* (2013.01); *G02F 2001/133521* (2013.01)

(58) Field of Classification Search
CPC ............. G06K 9/00885; G06K 9/2027; G06K 9/4604; G09G 2300/0439; G09G 2300/0452; G09G 3/3233; G09G 5/003
See application file for complete search history.

(56) References Cited

U.S. PATENT DOCUMENTS

| | | | | |
|---|---|---|---|---|
| 9,286,848 | B2* | 3/2016 | Kurokawa | G06F 3/0412 |
| 9,704,011 | B2* | 7/2017 | Yang | G06K 9/0002 |
| 9,836,165 | B2* | 12/2017 | Nho | G06F 3/0421 |
| 2003/0174870 | A1 | 9/2003 | Kim et al. | |
| 2006/0017862 | A1 | 1/2006 | Song et al. | |
| 2006/0146035 | A1 | 7/2006 | Cha et al. | |
| 2007/0070267 | A1* | 3/2007 | Yang | G02F 1/133514 349/106 |
| 2008/0121442 | A1* | 5/2008 | Boer | G06F 3/0412 178/18.09 |
| 2010/0079611 | A1* | 4/2010 | Suzuki | H04N 5/374 348/222.1 |
| 2012/0146953 | A1 | 6/2012 | Yi et al. | |
| 2013/0135328 | A1 | 5/2013 | Rappoport et al. | |
| 2014/0354905 | A1 | 12/2014 | Kitchens et al. | |
| 2016/0292487 | A1 | 10/2016 | Sun et al. | |
| 2017/0154199 | A1 | 6/2017 | Li et al. | |
| 2017/0168333 | A1* | 6/2017 | Kubota | H01L 1/1259 |
| 2017/0205913 | A1* | 7/2017 | Kimura | G02F 1/13338 |
| 2018/0285619 | A1* | 10/2018 | Kim | G06K 9/00013 |
| 2019/0043420 | A1* | 2/2019 | Jung | H01L 27/3234 |
| 2019/0138123 | A1* | 5/2019 | Jung | G06F 3/044 |

FOREIGN PATENT DOCUMENTS

| | | |
|---|---|---|
| KR | 10-2004-0034776 A | 4/2004 |
| KR | 10-2006-0072436 A | 6/2006 |
| KR | 10-1122233 B1 | 3/2012 |
| KR | 10-2012-0065653 A | 6/2012 |
| WO | 2008/002043 A1 | 1/2008 |

* cited by examiner

ELECTRONIC DEVICE HAVING A BIOMETRIC SENSOR

CROSS-REFERENCE TO RELATED APPLICATION(S)

This application claims the benefit under 35 U.S.C. § 119(a) of a Korean patent application filed on Dec. 12, 2016 in the Korean Intellectual Property Office and assigned Serial number 10-2016-0168674, the entire disclosure of which is hereby incorporated by reference.

TECHNICAL FIELD

The present disclosure relates to an electronic device having a biometric sensor.

BACKGROUND

With the development of information and communication technologies, semiconductor technologies, and the like, mobile electronic devices, for example, smart phones, have become a necessity for modern people. Users may get various services by installing various applications on their smart phones.

The above information is presented as background information only to assist with an understanding of the present disclosure. No determination has been made, and no assertion is made, as to whether any of the above might be applicable as prior art with regard to the present disclosure.

SUMMARY

In recent years, an electronic device has been added with a function of recognizing user's biometric information for user authentication, and the like.

For example, the electronic device may include, as a biometric sensor, a fingerprint recognition module, a proximity sensor module, an illumination sensor module, an iris sensing module, or the like.

In the electronic device of the related art, the biometric sensor is mainly mounted in a non-display region in which a display is not provided. For example, the biometric sensor may be disposed in a region provided on an upper side of the display or on a region provided on a lower side of the display, on a front surface on which the display is disposed.

On the other hand, needs of users who want to have a larger screen region (display region) of the display continue even if the overall size of the electronic device is the same. However, in order to extend the screen region of the display, it is necessary to reduce a margin of the non-display region. In the electronic device of the related art, it may be difficult to reduce the margin of the non-display region due to the biometric sensor.

Aspects of the present disclosure are to address at least the above-mentioned problems and/or disadvantages and to provide at least the advantages described below. Accordingly, an aspect of the present disclosure is to provide an electronic device capable of meeting needs of users who want to have a larger screen region (display region) of a display by allowing a biometric sensor to be arranged to correspond to a screen region of the display.

Another aspect of the present disclosure is to provide an electronic device having a biometric sensor, including: a display including a first region that includes a plurality of first pixels arranged in a first manner and a second region that includes a plurality of second pixels arranged in a second manner, a biometric sensor disposed in at least a part of the first region, and a processor electrically coupled with the display and the biometric sensor and configured to receive a user input through the first region, and control the biometric sensor to detect biometric information corresponding to the user input.

Yet another aspect of the present disclosure is to provide an electronic device having a biometric sensor, including: a display that includes a first region including a plurality of first pixels arranged in a first manner and having a first form and a second region including a plurality of second pixels arranged in a second manner and having a second form, a biometric sensor disposed in at least a part of the first region, and a processor electrically coupled with the display and the biometric sensor and configured to receive a user input through the first region and control the biometric sensor to detect biometric information corresponding to the user input, wherein the first region has transmittance higher than transmittance of the second region.

Still another aspect of the present disclosure is to provide an electronic device having a biometric sensor, including a display, a biometric sensor disposed corresponding to at least a part of a display region of the display, and a processor electrically coupled with the display and the biometric sensor, wherein the display region may be divided into a first region in which the biometric sensor is disposed and a second region other than the first region, and wherein transmittance of the first region may be higher than transmittance of the second region.

According to various aspects of the present disclosure, it is possible to meet the needs of users who want to have the larger screen region (display region) of the display by allowing the biometric sensor to be arranged to correspond to the screen region of the display.

Other aspects, advantages, and salient features of the disclosure will become apparent to those skilled in the art from the following description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
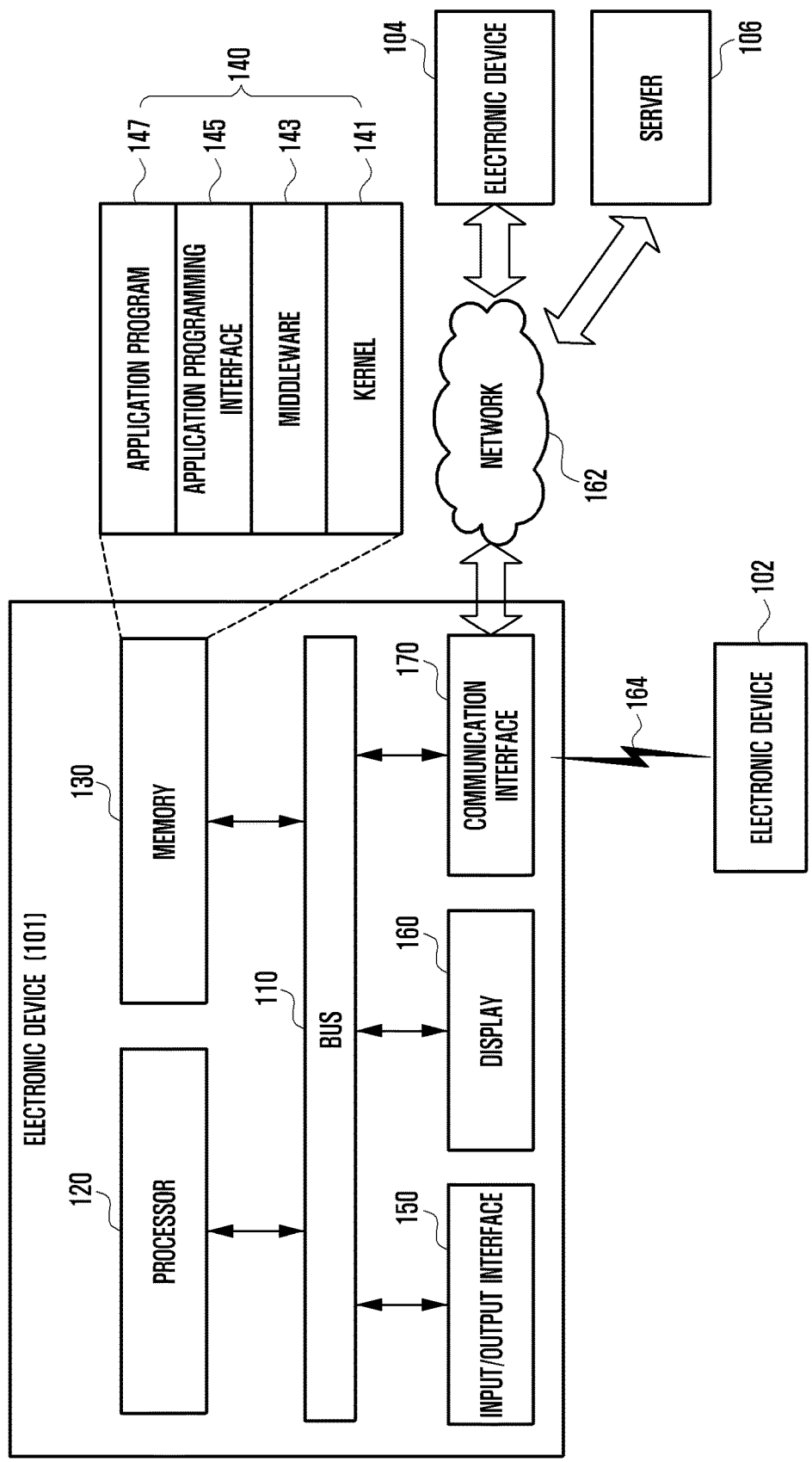
FIG. 1 is a block diagram illustrating an electronic device within network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the dictionary meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expressions such as "include" and "may include" may denote the presence of the disclosed functions, operations, and constituent elements and do not limit one or more additional functions, operations, and constituent elements. Terms such as "include" and/or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

Furthermore, in the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

In the case where a component is referred to as being "connected" or "accessed" to another component, it should be understood that not only the component is directly connected or accessed to the other component, but also there may exist another component between them. Meanwhile, in the case where a component is referred to as being "directly connected" or "directly accessed" to another component, it should be understood that there is no component therebetween. The terms used in the present disclosure are only used to describe specific various embodiments, and are not intended to limit the present disclosure. As used herein, the singular forms are intended to include the plural forms as well, unless the context clearly indicates otherwise. Singular forms are intended to include plural forms unless the context clearly indicates otherwise.

An electronic device according to the present disclosure may be a device including a communication function. For example, the device corresponds to a combination of at least one of a smartphone, a tablet personal computer (PC), a mobile phone, a video phone, an e-book reader, a desktop PC, a laptop PC, a netbook computer, a personal digital assistant (PDA), a portable multimedia player (PMP), a digital audio player, a mobile medical device, an electronic bracelet, an electronic necklace, an electronic accessory, a camera, a wearable device, an electronic clock, a wrist watch, home appliances (for example, an air-conditioner, vacuum, an oven, a microwave, a washing machine, an air cleaner, and the like), an artificial intelligence robot, a TeleVision (TV), a digital versatile disc (DVD) player, an audio device, various medical devices (for example, magnetic resonance angiography (MRA), magnetic resonance imaging (MRI), computed tomography (CT), a scanning machine, a ultrasonic wave device, or the like), a navigation device, a global positioning system (GPS) receiver, an event data recorder (EDR), a flight data recorder (FDR), a set-top box, a TV box (for example, Samsung HomeSync™, Apple TV™, or Google TV™), an electronic dictionary, vehicle infotainment device, an electronic equipment for a ship (for example, navigation equipment for a ship, gyrocompass, or the like), avionics, a security device, electronic clothes, an electronic key, a camcorder, game consoles, a head-mounted display (HMD), a flat panel display device, an electronic frame, an electronic album, furniture or a portion of a building/structure that includes a communication function, an electronic board, an electronic signature receiving device, a projector, and the like. It is obvious to those skilled in the art that the electronic device according to the present disclosure is not limited to the aforementioned devices.

FIG. 1 is a block diagram illustrating a configuration of an electronic device according to an embodiment of the present disclosure.

Referring to FIG. 1, the electronic device 101 may include a bus 110, a processor 120, a memory 130, an input/output interface 150, a display 160 and a communication interface 170, and other similar and/or suitable components.

The bus 110 may be a circuit which interconnects the above-described elements and delivers a communication (e.g., a control message) between the above-described elements.

The processor 120 may receive commands from the above-described other elements (e.g., the memory 130, input/output interface 150, the display 160, the communication interface 170, etc.) through the bus 110, may interpret the received commands, and may execute calculation or data processing according to the interpreted commands. The processor 120 may include a microprocessor or any suitable type of processing circuitry, such as one or more general-purpose processors (e.g., advanced RISC machines (ARM)-based processors), a digital signal processor (DSP), a programmable logic device (PLD), an application-specific integrated circuit (ASIC), a field-programmable gate array (FPGA), a graphical processing unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and operations provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The memory 130 may store commands or data received from the processor 120 or other elements (e.g., the input/output interface 150, a display 160 and a communication interface 170, etc.) or generated by the processor 120 or the other elements. The memory 130 may include programming modules 140, such as a kernel 141, middleware 143, an application programming interface (API) 145, an application 147, and the like. Each of the above-described programming modules 140 may be implemented in software, firmware, hardware, or a combination of two or more thereof.

The kernel 141 may control or manage system resources (e.g., the bus 110, the processor 120, the memory 130, and/or other hardware and software resources) used to execute operations or functions implemented by other programming modules (e.g., the middleware 143, the API 145, and the application 147). Also, the kernel 141 may provide an interface capable of accessing and controlling or managing the individual elements of the electronic device 101 by using the middleware 143, the API 145, or the application 147.

The middleware 143 may serve to go between the API 145 or the application 147 and the kernel 141 in such a manner that the API 145 or the application 147 communicates with the kernel 141 and exchanges data therewith. Also, in relation to work requests received from one or more applications 147 and/or the middleware 143, for example, may perform load balancing of the work requests by using a method of assigning a priority, in which system resources (e.g., the bus 110, the processor 120, the memory 130, etc.) of the electronic device 101 can be used, to at least one of the one or more applications 147.

The API 145 is an interface through which the application 147 is capable of controlling a function provided by the kernel 141 or the middleware 143, and may include, for example, at least one interface or function for file control, window control, image processing, character control, or the like.

The input/output interface 150, for example, may receive a command or data as input from a user, and may deliver the received command or data to the processor 120 or the memory 130 through the bus 110. The display 160 may display a video, an image, data, or the like to the user.

The communication interface 170 may connect communication between another electronic device 102 and the electronic device 101. The communication interface 170 may support a predetermined short-range communication protocol 164 (e.g., Wi-Fi, BlueTooth (BT), and near field communication (NFC)), or predetermined network 162 (e.g., the Internet, a local area network (LAN), a wide area network (WAN), a telecommunication network, a cellular network, a satellite network, a plain old telephone service (POTS), or the like). Each of the electronic devices 102 and 104 may be a device which is identical (e.g., of an identical type) to or different (e.g., of a different type) from the electronic device 101. Further, the communication interface 170 may connect communication between a server 106 and the electronic device 101 via the network 162.

Figure 2:
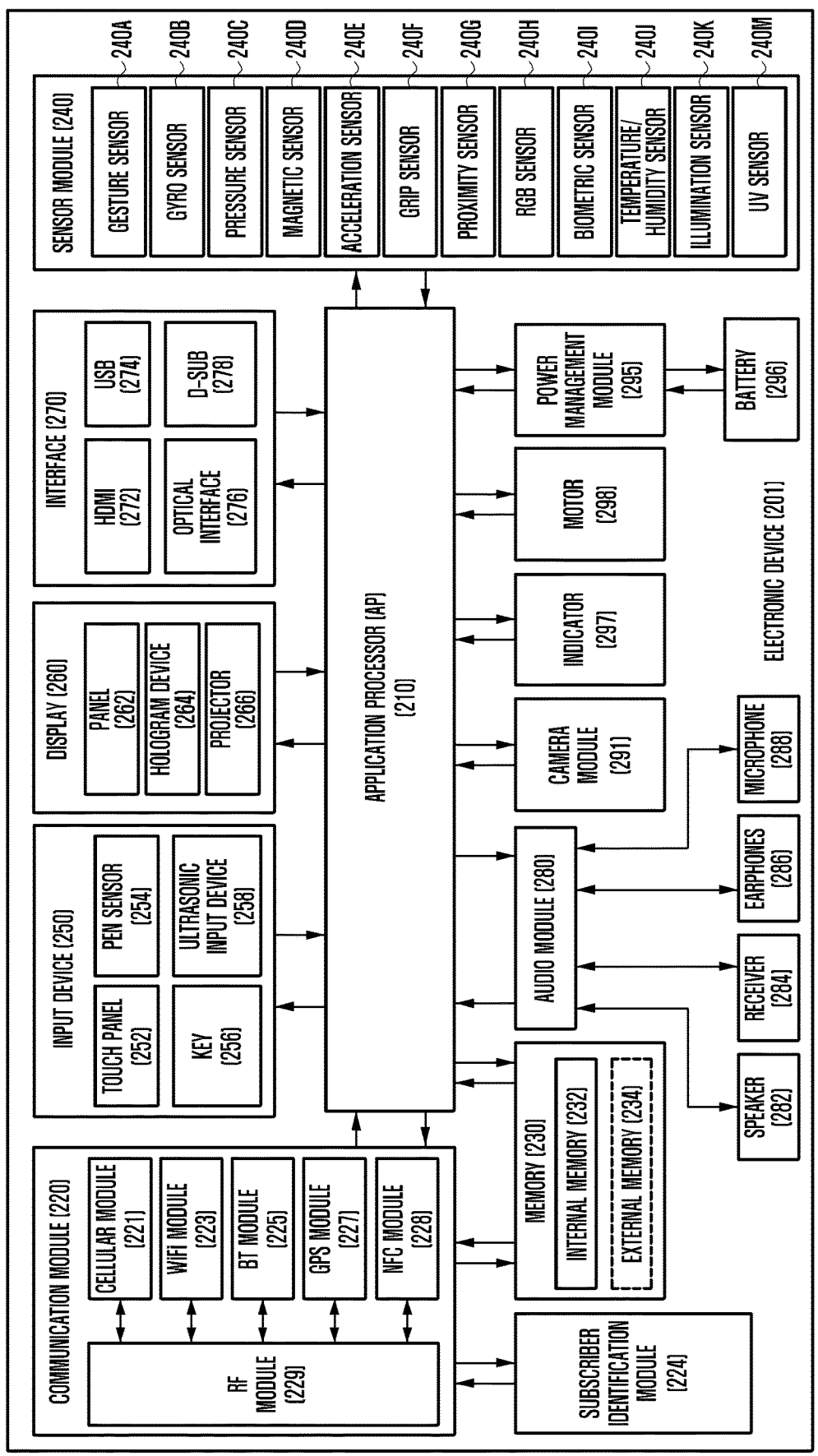
FIG. 2 is a block diagram of the electronic device according to various embodiments of the present disclosure.

FIG. 2 is a block diagram illustrating a configuration of an electronic device 201 according to an embodiment of the present disclosure.

The hardware shown in FIG. 2 may be, for example, the electronic device 101 illustrated in FIG. 1.

Referring to FIG. 2, the electronic device may include one or more application processors (APs) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, a motor 298 and any other similar and/or suitable components.

The AP 210 (e.g., the processor 120) may include one or more APs, or one or more communication processors (CPs). The AP 210 may be, for example, the processor 120 illustrated in FIG. 1. The AP 210 is illustrated as being included in the processor 210 in FIG. 2, but may be included in different integrated circuit (IC) packages, respectively. According to an embodiment of the present disclosure, the AP 210 may be included in one IC package.

The AP 210 may execute an operating system (OS) or an application program, and thereby may control multiple hardware or software elements connected to the AP 210 and may perform processing of and arithmetic operations on various data including multimedia data. The AP 210 may be implemented by, for example, a system on chip (SoC). According to an embodiment of the present disclosure, the AP 210 may further include a GPU (not illustrated).

The AP 210 may manage a data line and may convert a communication protocol in the case of communication between the electronic device (e.g., the electronic device 101) including the hardware and different electronic devices connected to the electronic device through the network. The AP 210 may be implemented by, for example, a SoC.

According to an embodiment of the present disclosure, the AP 210 may perform at least some of multimedia control functions. The AP 210, for example, may distinguish and authenticate a terminal in a communication network by using a subscriber identification module (e.g., the SIM card 224). Also, the AP 210 may provide the user with services, such as a voice telephony call, a video telephony call, a text message, packet data, and the like.

Further, the AP 210 may control the transmission and reception of data by the communication module 220. In FIG. 2, the elements such as the AP 210, the power management module 295, the memory 230, and the like are illustrated as elements separate from the AP 210. However, according to an embodiment of the present disclosure, the AP 210 may include at least some (e.g., the CP) of the above-described elements.

According to an embodiment of the present disclosure, the AP 210 may load, to a volatile memory, a command or data received from at least one of a non-volatile memory and other elements connected to each of the AP 210, and may process the loaded command or data. Also, the AP 210 may store, in a non-volatile memory, data received from or generated by at least one of the other elements.

The SIM card 224 may be a card implementing a subscriber identification module, and may be inserted into a slot formed in a particular portion of the electronic device 101. The SIM card 224 may include unique identification information (e.g., integrated circuit card IDentifier (ICCID)) or subscriber information (e.g., international mobile subscriber identity (IMSI)).

The memory 230 may include an internal memory 232 and an external memory 234. The memory 230 may be, for example, the memory 130 illustrated in FIG. 1. The internal memory 232 may include, for example, at least one of a volatile memory (e.g., a dynamic RAM (DRAM), a static RAM (SRAM), a synchronous dynamic RAM (SDRAM), etc.), and a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a Not AND (NAND) flash memory, a not OR (NOR) flash memory, etc.). According to an embodiment of the present disclosure, the internal memory 232 may be in the form of a solid state drive (SSD). The external memory 234 may further include a flash drive, for example, a compact flash (CF), a secure digital (SD), a micro-secure digital (Micro-SD), a mini-secure digital (Mini-SD), an extreme Digital (xD), a memory stick, or the like.

The communication module 220 may include a cellular module 221, a Wi-Fi module 223 or a radio frequency (RF) module 229. The communication module 220 may be, for example, the communication interface 170 illustrated in FIG. 1. The communication module 220 may include, for example, a Wi-Fi module 223, a BT module 225, a GPS module 227, or a NFC module 228. For example, the Wi-Fi module 223 may provide a Wi-Fi communication function by using a RF. Additionally or alternatively, the Wi-Fi module 223 may include a network interface (e.g., a LAN card), a modulator/demodulator (modem), or the like for connecting the hardware to a network (e.g., the Internet, a LAN, a WAN, a telecommunication network, a cellular network, a satellite network, a POTS, or the like).

The RF module 229 may be used for transmission and reception of data, for example, transmission and reception of RF signals or called electronic signals. Although not illustrated, the RF module 229 may include, for example, a transceiver, a power amplifier module (PAM), a frequency filter, a low noise amplifier (LNA), or the like. Also, the RF module 229 may further include a component for transmitting and receiving electromagnetic waves in a free space in a Wi-Fi communication, for example, a conductor, a conductive wire, or the like.

The sensor module 240 may include, for example, at least one of a gesture sensor 240A, a gyro sensor 240B, a pressure sensor 240C, a magnetic sensor 240D, an acceleration sensor 240E, a grip sensor 240F, a proximity sensor 240G, a red, green and blue (RGB) sensor 240H, a biometric sensor 240I, a temperature/humidity sensor 240J, an illumination sensor 240K, and a ultra violet (UV) sensor 240M. The sensor module 240 may measure a physical quantity or may sense an operating state of the electronic device 101, and may convert the measured or sensed information to an electrical signal. Additionally/alternatively, the sensor module 240 may include, for example, an E-nose sensor (not illustrated), an electro myo graphy (EMG) sensor (not illustrated), an electro encephalo gram (EEG) sensor (not illustrated), an electro cardio gram (ECG) sensor (not illustrated), a fingerprint sensor (not illustrated), and the like. Additionally or alternatively, the sensor module 240 may include, for example, an E-nose sensor (not illustrated), an EMG sensor (not illustrated), an EEG sensor (not illustrated), an ECG sensor (not illustrated), a fingerprint sensor, and the like. The sensor module 240 may further include a control circuit (not illustrated) for controlling one or more sensors included therein.

The input device 250 may include a touch panel 252, a pen sensor 254 (e.g., a digital pen sensor), keys 256, and an ultrasonic input unit 258. The input device 250 may be, for example, the input/output interface 150 illustrated in FIG. 1. The touch panel 252 may recognize a touch input in at least one of, for example, a capacitive scheme, a resistive scheme, an infrared scheme, and an acoustic wave scheme. Also, the touch panel 252 may further include a controller (not illustrated). In the capacitive type, the touch panel 252 is capable of recognizing proximity as well as a direct touch. The touch panel 252 may further include a tactile layer (not illustrated). In this event, the touch panel 252 may provide a tactile response to the user.

The pen sensor 254 (e.g., a digital pen sensor), for example, may be implemented by using a method identical or similar to a method of receiving a touch input from the user, or by using a separate sheet for recognition. For example, a key pad or a touch key may be used as the keys 256. The ultrasonic input unit 258 enables the terminal to sense a sound wave by using a microphone (e.g., a microphone 288) of the terminal through a pen generating an ultrasonic signal, and to identify data. The ultrasonic input unit 258 is capable of Wi-Fi recognition. According to an embodiment of the present disclosure, the hardware may receive a user input from an external device (e.g., a network, a computer, or a server), which is connected to the communication module 220, through the communication module 220.

The display 260 may include a panel 262, a hologram device 264, or projector 266. The display 260 may be, for example, the display 160 illustrated in FIG. 1. The panel 262 may be, for example, a liquid crystal display (LCD) and an active matrix organic light emitting diode (AM-OLED) display, and the like. The panel 262 may be implemented so as to be, for example, flexible, transparent, or wearable. The panel 262 may include the touch panel 252 and one module. The hologram device 264 may display a three-dimensional image in the air by using interference of light. According to an embodiment of the present disclosure, the display 260 may further include a control circuit for controlling the panel 262 or the hologram device 264.

The interface 270 may include, for example, a high-definition multimedia interface (HDMI) 272, a universal Serial bus (USB) 274, an optical interface 276, and a D-subminiature (D-sub) 278. Additionally or alternatively, the interface 270 may include, for example, SD/multi-media card (MMC) (not illustrated) or infrared data association (IrDA) (not illustrated).

The audio module 280 may bidirectionally convert between a voice and an electrical signal. The audio module 280 may convert voice information, which is input to or output from the audio module 280, through, for example, a speaker 282, a receiver 284, an earphone 286, the microphone 288 or the like.

The camera module 291 may capture an image and a moving image. According to an embodiment, the camera module 291 may include one or more image sensors (e.g., a front lens or a back lens), an image signal processor (ISP) (not illustrated), and a flash LED (not illustrated).

The power management module 295 may manage power of the hardware. Although not illustrated, the power management module 295 may include, for example, a power management integrated circuit (PMIC), a charger IC, or a battery fuel gauge.

The PMIC may be mounted to, for example, an IC or a SoC semiconductor. Charging methods may be classified into a wired charging method and a Wi-Fi charging method. The charger IC may charge a battery, and may prevent an overvoltage or an overcurrent from a charger to the battery. According to an embodiment of the present disclosure, the charger IC may include a charger IC for at least one of the wired charging method and the Wi-Fi charging method. Examples of the Wi-Fi charging method may include a magnetic resonance method, a magnetic induction method, an electromagnetic method, and the like. Additional circuits (e.g., a coil loop, a resonance circuit, a rectifier, etc.) for Wi-Fi charging may be added in order to perform the Wi-Fi charging.

The battery fuel gauge may measure, for example, a residual quantity of the battery 296, or a voltage, a current or a temperature during the charging. The battery 296 may supply power by generating electricity, and may be, for example, a rechargeable battery.

The indicator 297 may indicate particular states of the hardware or a part (e.g., the AP 210) of the hardware, for example, a booting state, a message state, a charging state and the like. The motor 298 may convert an electrical signal into a mechanical vibration. The AP 210 may control the sensor module 240.

Although not illustrated, the hardware may include a processing unit (e.g., a GPU) for supporting a module TV. The processing unit for supporting a module TV may process media data according to standards such as, for example, digital multimedia broadcasting (DMB), digital video broadcasting (DVB), media flow, and the like. Each of the above-described elements of the hardware according to an embodiment of the present disclosure may include one or more components, and the name of the relevant element may change depending on the type of electronic device. The hardware according to an embodiment of the present disclosure may include at least one of the above-described elements. Some of the above-described elements may be omitted from the hardware, or the hardware may further include additional elements. Also, some of the elements of the hardware according to an embodiment of the present disclosure may be combined into one entity, which may perform functions identical to those of the relevant elements before the combination.

The term "module" used in the present disclosure may refer to, for example, a unit including one or more combinations of hardware, software, and firmware. The "module" may be interchangeable with a term, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module" according to an embodiment of the present disclosure may include at least one of an ASIC chip, a FPGA, and a programmable-logic device for performing certain operations which have been known or are to be developed in the future.

Figure 3:
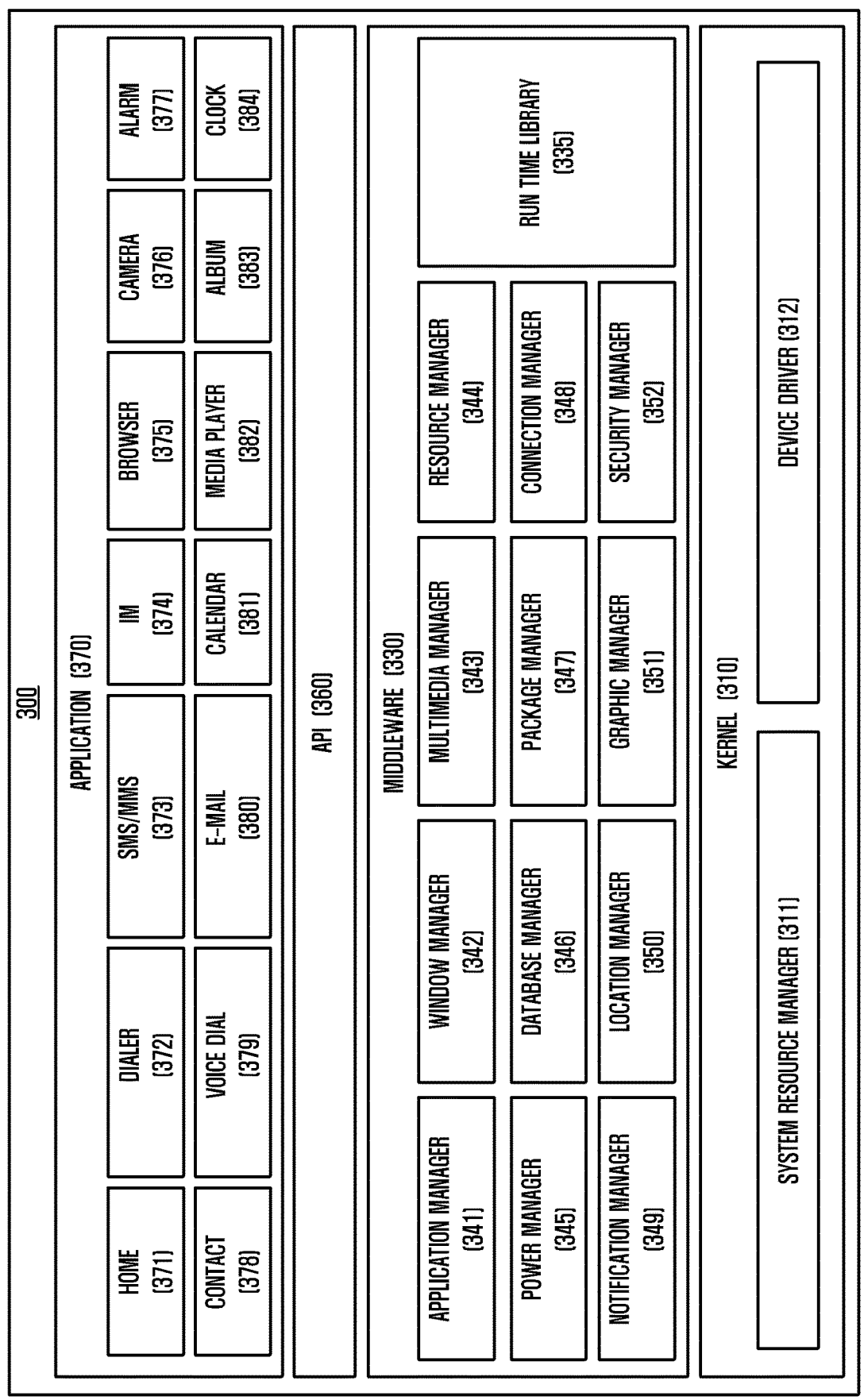
FIG. 3 is a block diagram of a program module according to various embodiments of the present disclosure.

FIG. 3 is a block diagram illustrating a configuration of one or more programming modules 300 according to an embodiment of the present disclosure.

Referring to FIG. 3, the programming module 300 may be included (or stored) in the electronic device 101 (e.g., the memory 130) or may be included (or stored) in the electronic device 201 (e.g., the memory 230) illustrated in FIG. 1. At least a part of the programming module 300 may be implemented in software, firmware, hardware, or a combination of two or more thereof. The programming module 300 may be implemented in hardware (e.g., the hardware), and may include an OS controlling resources related to an electronic device (e.g., the electronic device 101) and/or various applications (e.g., an application 370) executed in the OS. For example, the OS may be Android, iOS, Windows, Symbian, Tizen, Bada, and the like.

Referring to FIG. 3, the programming module 300 may include a kernel 310, a middleware 330, an API 360, and/or the application 370.

The kernel 310 (e.g., the kernel 141) may include a system resource manager 311 and/or a device driver 312. The system resource manager 311 may include, for example, a process manager (not illustrated), a memory manager (not illustrated), and a file system manager (not illustrated). The system resource manager 311 may perform the control, allocation, recovery, and/or the like of system resources. The device driver 312 may include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 312 may include an inter-process communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 143) may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a basic input/output system (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a Wi-Fi connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 101) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 145) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 147) may include, for example, a preloaded application and/or a third party application. The applications 370 may include, for example, a home application 371, a dialer application 372, a short message service (SMS)/multimedia message service (MMS) application 373, an instant message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 300 may be implemented by instructions stored in a non-transitory computer-readable storage medium. When the instructions are executed by one or more processors (e.g., the one or more APs 210), the one or more processors may perform functions corresponding to the instructions. The non-transitory computer-readable storage medium may be, for example, the memory 230. At least a part of the programming module 300 may be implemented (e.g., executed) by, for example, the one or more APs 210. At least a part of the programming module 300 may include, for example, a module, a program, a routine, a set of instructions, and/or a process for performing one or more functions.

Names of the elements of the programming module (e.g., the programming module 300) according to an embodiment of the present disclosure may change depending on the type of OS. The programming module according to an embodiment of the present disclosure may include one or more of the above-described elements. Alternatively, some of the above-described elements may be omitted from the programming module. Alternatively, the programming module may further include additional elements. The operations performed by the programming module or other elements according to an embodiment of the present disclosure may be processed in a sequential method, a parallel method, a repetitive method, or a heuristic method. Also, some of the operations may be omitted, or other operations may be added to the operations. An electronic device having a biometric sensor according to various embodiments of the present disclosure includes a display including a first region that includes a plurality of first pixels arranged in a first manner and a second region that includes a plurality of second pixels arranged in a second manner, a biometric sensor disposed in at least a part of the first region, and a processor controlling the display and the biometric sensor, wherein the processor may be configured to receive a user input through the first region and control the biometric sensor to detect biometric information corresponding to the user input. The plurality of first pixels may have a first shape and the plurality of second pixels may have a second shape. A maximum spacing distance between the first pixels adjacent to each other may be larger than that between the second pixels adjacent to each other. The plurality of first pixels may be arranged in a matrix form, and the plurality of second pixels may be arranged in a zigzag form. The first region may include a plurality of first pixels, the second region may include a plurality of second pixels, the plurality of first pixels and the plurality of second pixels have the same structure and shape, and the plurality of first pixels may have resolution lower than that of the plurality of second pixels. The plurality of first pixels may have a smaller number of pixels for displaying a specific color than the plurality of second pixels. The first region may include the plurality of first pixels, the second region may include the plurality of second pixels, each of the first pixels may include a (a is an integer greater than or equal to 2) switching elements and b (b is an integer greater than or equal to 1) capacitors, and each of the second pixels may include c (c is an integer greater than a) switching elements and d (d is an integer greater than or equal to b) capacitors. The first region may include a first layer on which the switching element and the capacitor are formed and a second layer disposed over the first layer and having organic light emitting elements disposed thereon, and the biometric sensor may include a light emitting element and a light receiving element positioned on the same layer as or different layers from the first and second layers. In the biometric sensor, the light emitting element and the light receiving element may be disposed under the first layer. The light emitting element may be configured as an organic light emitting element on the second layer. At least some of the organic light emitting elements may be configured to emit invisible light. The light receiving element may be formed under the first layer. The light receiving element may be configured as a switching element on the first layer. The light receiving element may be configured as a diode or a light receiving type transistor on the second layer. At least one of the first and second layers may be provided with a light shielding barrier. The second layer may be provided with a light shielding filter that transmits only light of a specific wavelength. The filter may transmit only light of a wavelength band output from the light emitting element. Transmittance of the first region may be higher than that of the second region.

An electronic device having a biometric sensor according to various embodiments of the present disclosure includes a display that includes a first region including a plurality of first pixels arranged in a first manner and having a first form and a second region including a plurality of second pixels arranged in a second manner and having a second form, a biometric sensor disposed in at least a part of the first region, and a processor for controlling the display and the biometric sensor, wherein the processor is configured to receive a user input through the first region and control the biometric sensor to detect biometric information corresponding to the user input, and the first region has transmittance higher than that of the second region. The transmittance of the first region may be higher than that of the second region. The plurality of first pixels may have resolution lower than that of the plurality of second pixels.

An electronic device having a biometric sensor according to various embodiments of the present disclosure includes a display, a biometric sensor disposed corresponding to at least a part of a display region of the display, and a processor controlling the display and the biometric sensor, wherein the display region may be divided into a first region in which the biometric sensor is disposed and a second region other than the first region, and transmittance of the first region may be higher than that of the second region.

Figure 4:
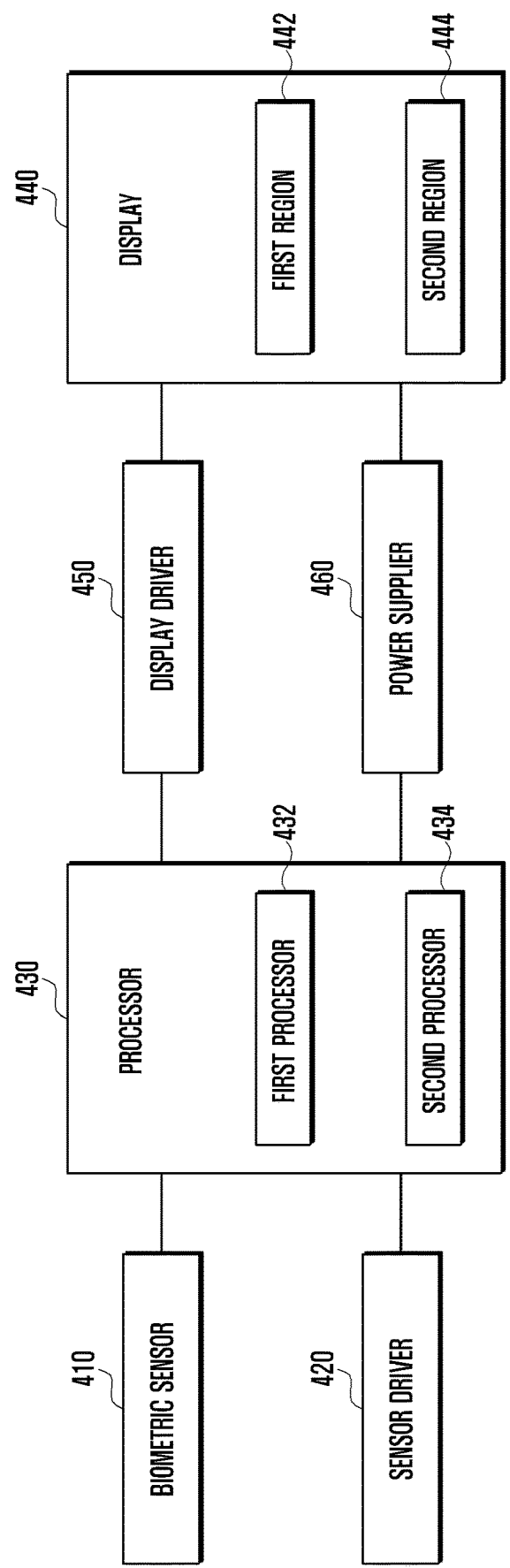
FIG. 4 is a block diagram illustrating a configuration of an electronic device according to an embodiment of the present disclosure.

FIG. 4 is a block diagram illustrating a configuration of an electronic device according to an embodiment of the present disclosure.

Referring to FIG. 4, an electronic device according to an embodiment of the present disclosure includes a biometric sensor 410, a processor 430, a display 440, a display driver 450, and a power supplier 460.

The biometric sensor 410 may be a proximity sensor, an illuminance sensor, a fingerprint sensor, or an iris sensor. In addition, the biometric sensor may be a biometric sensor using various methods. For example, the biometric sensor may be a biometric sensor configured by an ultrasonic type or an electrostatic type. According to one embodiment, at least a part of the biometric sensor may be disposed in the display region of the display 440. For example, the fingerprint sensor may be disposed in a part of the display region of the display 440 so as to detect user's fingerprint information at the time of a user's touch input.

The sensor driver 420 may drive the biometric sensor 410. The sensor driver 420 may transmit the biometric information of the user sensed by the biometric sensor 410 to the processor 430. The sensor driver 420 may be provided for each kind of the biometric sensors 410. Alternatively, the sensor driver 420 may be configured as a single chip capable of driving all of the plurality of biometric sensors 410. According to various embodiments, at least some of the sensor drivers 420 may be included in the processor 430 or the display driver 450.

The processor 430 may control each component of the electronic device. As illustrated in FIG. 1, the processor 430 may have the same or similar configuration as the processor 430. The processor 430 may include a first processor 432 and a second processor 434. The first processor 432 may control the overall operation of the electronic device. The second processor 434 may process information obtained via at least one sensor or information input from a user without waking up the first processor when the electronic device is in a sleep state. According to one embodiment, the second processor 434 may control the biometric sensor 410, the touch sensor, or the display 440 independently of the first processor 432.

The display 440 may be configured as an organic light emitting diode (OLED) display. According to one embodiment, the display 440 may include a display region and a non-display region. According to one embodiment, the display region may be divided into a first region 442 in which at least one biometric sensor 410 is disposed and a second region 444 other than the first region 442. For example, the fingerprint sensor may be disposed in the first region 442. The fingerprint sensor may be embedded in the display region of the display 440 or may be disposed under the display region. According to one embodiment, the fingerprint sensor may optically sense a user's fingerprint. Further, the fingerprint sensor may utilize light emitted from the display region of the display 440 as a light emitting element, or may further include a light emitting element separately from the display 440.

The first region 442 may display a user interface or a specific image under the control of the processor 430 or the display driver 450 in a general driving state of the electronic device. According to one embodiment, the first region 442 may display or may not display an image under the control of the processor 430 or the display driver 450 in the sensing state of the electronic device. In the sensing state of the electronic device, the biometric sensor 410 disposed in the first region 442, for example, the fingerprint sensor may be activated. According to one embodiment, the first region 442 may periodically detect the touch input or the approach of the user under the control of the processor 430 or the display driver 450 in the sleep state (or locked state) of the electronic device. In the sleep state of the electronic device, the fingerprint sensor may be activated if the touch input of the user or hovering is detected. The sensing state of the electronic device may be a state for sensing the user's biometric information and may be a state in which the display of the region in which the biometric sensor 410, the sensor driver 420, and the biometric sensor 410 are disposed or the touch sensor in which the biometric sensor 410 is disposed is activated. In the above description, the sleep state of the electronic device may be a low-power driving state or the locked state of the electronic device, and may be a state in which a component for detecting a user input requesting a release of the sleep state and only a low power processor (e.g., second processor 434) for controlling the component are driven.

The second region 444 may display a user interface or a specific image under the control of the processor 430 or the display driver 450 in a general driving state of the electronic device. According to one embodiment, the second region 444 may continuously provide a user interface or a specific image that is provided in the sensing state of the electronic device. Alternatively, in the sleep state of the electronic device, the driving of the second region 444 may stop under the control of the low power processor, for example, the second processor 434.

The display driver 450 may drive the display 440 under the control of the processor 430. The display driver 450 may include an interface block that may transmit and receive a command or a data to and from the processor 430 (e.g., AP 210 of FIG. 2) or the second processor 434 (e.g., low-power processor 430, hereinafter, LLP), a graphic memory that may store an image data received from the AP or the LPP, a mixer that may control a signal path of the data received from the interface block or the graphic memory, a processing module that may perform correction for the image data or processing of the biometric information, a memory that may store positional information or address information on the first region 442 in which an optical sensor (e.g., biometric recognition sensor, proximity/illuminance sensor, image sensor) is formed, a mapping module that may determine and process image data corresponding to the first region 442 and the second region 444 using the positional information or the address information on the first region 442, a source driver for driving pixels of the display 440 in an analog manner, the display 440 for displaying data corresponding to the first region 442 processed in the mapping module and data corresponding to the second region 444, a sensor that is formed in the first region 442 of the display 440 and may acquire the biometric information, and the sensor driver 420. According to one embodiment, the sensor driver 420 may drive a sensor, transmit the information acquired from the sensor to the processing module, the AP, and the LLP, or receive an instruction word from the processing module, the AP, and the LLP.

The power supplier 460 may supply a driving voltage required to drive each component of the electronic device. For example, the power supplier 460 may convert a reference voltage provided from a battery to generate a plurality of driving voltages and supply the plurality of generated driving voltages to each component of the electronic device.

Figure 5:
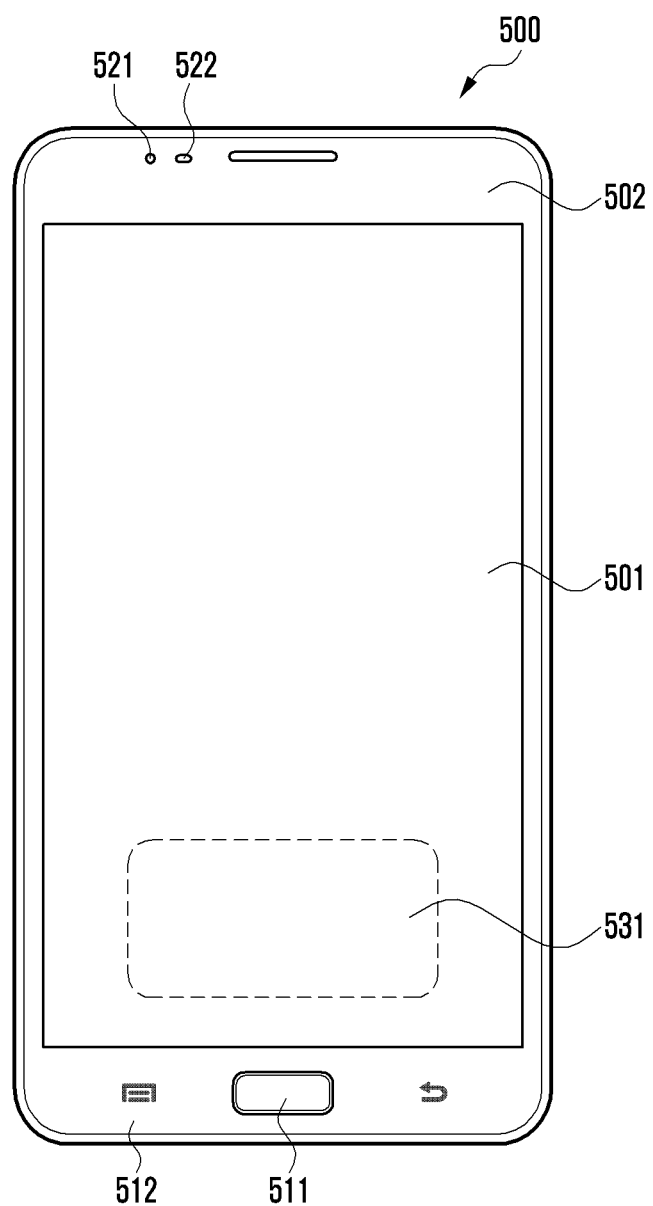
FIG. 5 is an exemplified diagram illustrating a front appearance of the electronic device according to the embodiment of the present disclosure.

FIG. 5 is an exemplified diagram illustrating a front appearance of the electronic device according to the embodiment of the present disclosure.

Referring to FIG. 5, an electronic device 500 according to an embodiment of the present disclosure may have a display 501 disposed on a front surface thereof. In the display 501 a region in which a screen is positioned may be defined as a display region. In the display 501, a region other than the display region may be defined as a non-display region 502. For example, the non-display region 502 may be at least one region surrounding the display region of the display 501 on the front of the electronic device 500. Alternatively, the non-display region 502 may be defined as a bezel region on front of the electronic device 500.

According to one embodiment, the non-display region 502 may be provided with at least one button for operating the functions of the electronic device 500. The button is formed in a separate hole or groove formed in a glass covering the front surface of the electronic device 500 and may be an operation button 511 that may be physically pressed. The operation button 511 may be, for example, a home button provided in the non-display region 502 of the electronic device 500. The home button may be disposed in the lower non-display region 502 of the electronic device 500. When the electronic device 500 performs a specific application, the home button 511 may move the specific application to an initial screen. Alternatively, the at least one button 512 may be a touch input button, unlike the home button 511.

According to one embodiment, the electronic device 500 may include at least one of biometric sensors. The at least one biometric sensor may be disposed in the non-display region 502 or the display region. The at least one biometric sensor may be a proximity sensor 521, an illuminance sensor 522, a fingerprint sensor 531, or an iris sensor. For example, some of the plurality of biometric sensors (e.g., proximity sensor 521 and illuminance sensor 522) may be disposed in the non-display region 502, and the other biometric sensor (e.g., fingerprint sensor 531) thereof may be disposed in the display region. The proximity sensor 521 may be disposed in the upper non-display region 502 of the electronic device 500. Alternatively, the illuminance sensor 522 may be disposed in the upper non-display region 502 of the electronic device 500. Alternatively, the fingerprint sensor 531 may be disposed in the display region (screen region) of the display 501.

Figure 6:
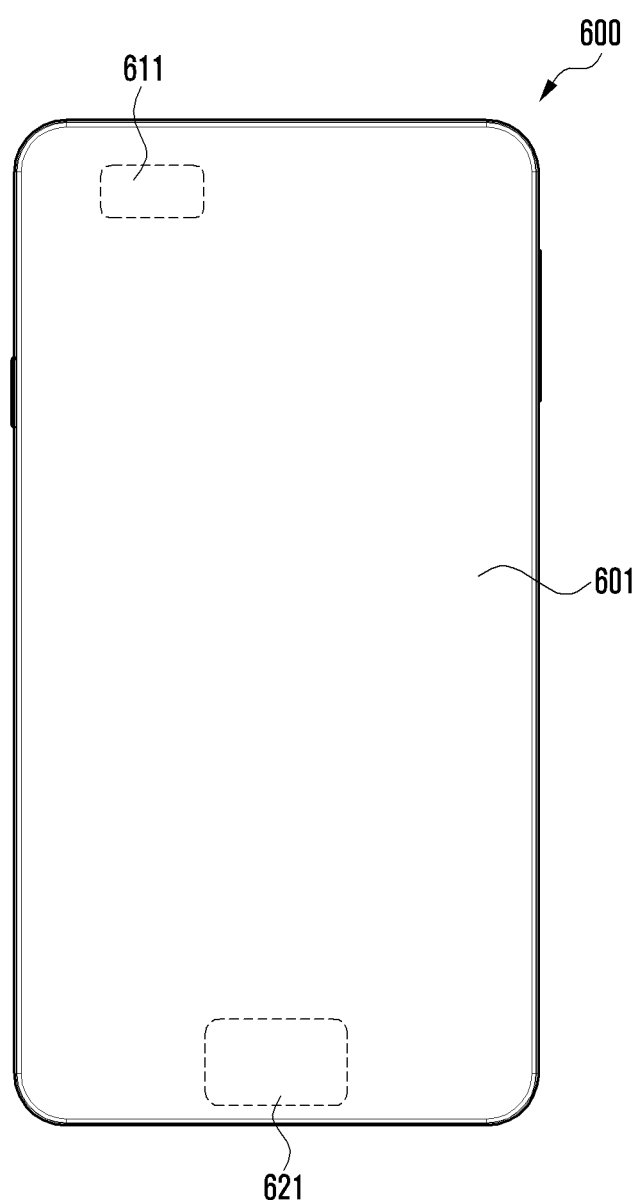
FIG. 6 is an exemplified diagram illustrating a front appearance of the electronic device according to the embodiment of the present disclosure.

FIG. 6 is an exemplified diagram illustrating a front appearance of the electronic device according to the embodiment of the present disclosure.

Referring to FIG. 6, according to another embodiment of the present disclosure, the front surface of the electronic device 600 may be completely configured as a display. For example, unlike the electronic device 500 illustrated in FIG. 5, the electronic device 600 may have the non-display region removed from the front surface thereof. Alternatively, the electronic device 600 according to another embodiment may have the non-display region having a width narrower than that of the electronic device 500 illustrated in FIG. 5.

According to the embodiment, at least a part of a display region 601 may be provided with biometric sensors 611 and 621. For example, the biometric sensors 611 and 621 may be a proximity sensor, an illuminance sensor, a fingerprint sensor, or an iris sensor. For example, the proximity sensor or the illuminance sensor may be disposed in a part of an upper part of the display region 601 of the electronic device 600, as denoted by reference numeral 611. Alternatively, the fingerprint sensor may be disposed in a part of a lower part of the display region 601 of the electronic device 600, as denoted by reference numeral 621. According to various embodiments, the region in which the biometric sensors 611 and 621 are disposed in the display region 601 may be defined in advance, and address information of the pre-defined biometric sensors 611 and 621 may be stored in the memory.

According to various embodiments of the present disclosure, at least one biometric sensor may be provided, and the at least one biometric sensor may be disposed in the display region 601 of the display. Therefore, the present disclosure may reduce a design margin of the non-display region and may design an area of the display to be larger.

According to various embodiments, the at least one biometric sensor disposed in the display region 601 may optically recognize the biometric information of the user. For example, the fingerprint sensor is disposed in the first region 621 of the display region 601 of the display, and may optically sense the fingerprint information of the user.

For example, the fingerprint sensor may include a light emitting element and a light receiving element. The light emitting element may emit light of a specific wavelength. If the light emitted from the light emitting element is reflected from the user's fingerprint, the light receiving element may recognize the fingerprint by sensing the reflected light. Hereinafter, for convenience of explanation, it is assumed that the biometric sensor disposed in the display region 601 is the fingerprint sensor. However, in the present disclosure, the biometric sensor disposed in the display region 601 may be various in addition to the fingerprint sensor. For example, the biometric sensor disposed in the display region 601 may be, for example, a proximity sensor, an illumination sensor, or an iris sensor.

In the expression described in the present document, the fact that the fingerprint sensor is embedded in the display region 601 of the display means that the fingerprint sensor is embedded in pixels configuring the display region 601 of the display. Alternatively, the fact that the fingerprint sensor is embedded in the display region 601 of the display means that the fingerprint sensor is separately configured from pixels configuring the display region 601 of the display.

If the fingerprint sensor is configured separately from pixels configuring the display region 601 of the display, the fingerprint sensor may be disposed to overlap with the lower part of the pixels configuring the display region 601 or may be disposed on the same layer as the pixels. For example, the fingerprint sensor may be disposed under a thin film transistor and an organic light emitting layer configuring the pixels of the display. Alternatively, the fingerprint sensor may be disposed under the thin film transistor and the organic light emitting layer configuring the pixels.

Since the fingerprint sensor optically recognizes the user's biometric information and is also disposed in the display region 601 of the display, the sensing performance may be determined according to the transmittance of the display. The electronic device 600 according to the embodiment of the present disclosure may improve the performance of the fingerprint sensor by designing the transmittance of the region in which the fingerprint sensor is disposed to be relatively larger in the display region 601 of the display.

According to various embodiments, the display region 601 may be divided into a first region in which at least one biometric sensor is disposed, and a second region other than the first region. The second region may be a region in which the biometric sensor is not disposed. For example, a region denoted by reference numerals 611 and 621 in FIG. 6 may be a first region as a region in which a biometric sensor is disposed. Alternatively, the region denoted by reference numeral 601 in FIG. 6 may be the second region as the region in which the biometric sensor is not disposed.

Hereinafter, the region denoted by reference numeral 621 in FIG. 6 is described as the first region, and the region denoted by reference numeral 601 in FIG. 6 is described as the second region.

The first region 621 may be a region for displaying an image during a normal driving period and collecting fingerprint information of a user by activating the operation of the fingerprint sensor when a specific function (e.g., user authentication function) is executed. Alternatively, the first region 621 may be a region that does not display an image in the sleep state of the electronic device 600 but identifies the user's fingerprint information by activating the operation of the fingerprint sensor. According to another embodiment, the first region 621 may be a region displaying an image regardless of whether the fingerprint sensor is activated or not. For example, the fingerprint sensor of the present disclosure may be configured to sense the fingerprint in a capacitive type or an ultrasonic type, in addition to an optical type. In this case, the pixels disposed in the first region may display an image while the fingerprint sensor senses the user fingerprint. In the above description, the technology of sensing the fingerprint by the capacitive or ultrasonic type may be the same or similar technology as disclosed in the prior art.

The second region 601 may be a region displaying a normal image irrespectively of a normal driving period or an execution period of the specific function. For example, as long as the specific function is not executed, the first and second regions 621 and 601 both may display the normal image. If the specific function is executed, the first region 621 does not display the normal image, but the operation of the fingerprint sensor is activated to collect fingerprint information of the user and the second region 601 may display the normal image. Alternatively, the second region 601 may be a region which does not display an image in the sleep state of the electronic device 600.

The sleep state may be, for example, the locked state of the electronic device 600. For example, if the electronic device 600 is in the sleep state, the low-power processor may be driven, only the operation of the fingerprint sensor or the touch sensor disposed in the first region 621 may be periodically detected under the control of the low-power processor, and operations of the rest devices configuring the electronic device 600 may stop. According to one embodiment, if the electronic device 600 is in the sleep state, an input of at least one button set for the unlocking may be detected.

Hereinafter, in an electronic device according to various embodiments of the present disclosure, a structure and a method for designing transmittance of a display region (first region) in which an optical biometric sensor (e.g., fingerprint sensor) is disposed to be relatively larger will be described in more detail.

Figure 7A:
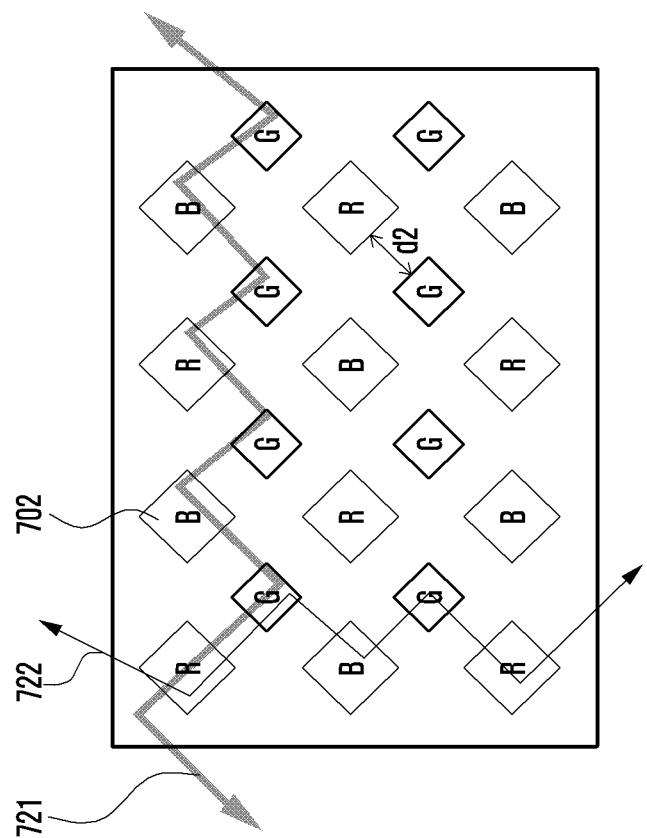
FIGS. 7A and 7B are plan views illustrating a pixel arrangement structure of a first region and a second region according to an embodiment of the present disclosure.
Figure 7B:
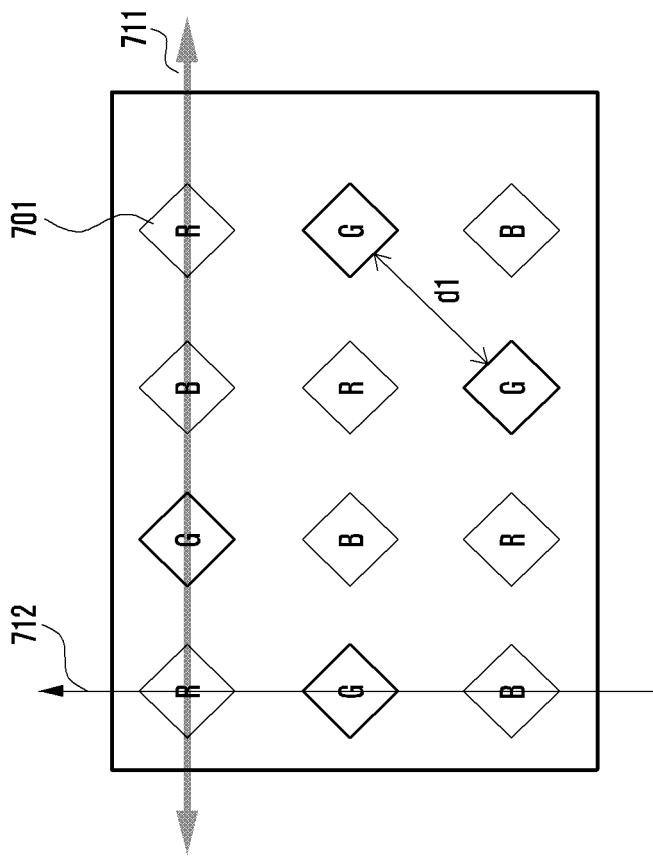

FIGS. 7A and 7B are plan views illustrating a pixel arrangement structure of a first region and a second region according to an embodiment of the present disclosure. FIG. 7A illustrates the pixel arrangement structure according to the first region, and FIG. 7B illustrates the pixel arrangement structure according to the second region.

Referring to FIGS. 7A and 7B, the display region of the display may include a plurality of first pixels 701 and second pixels 702. The plurality of first pixels 701 and second pixels 702 may be configured to display a first color to a third color. Although not illustrated, the plurality of first pixels 701 and second pixels 702 may be configured to display a first color to a fourth color. In the above description, the first to third colors may be red (R), green (G), and blue (B). Alternatively, in the above description, the first to fourth colors may be red (R), green (G), blue (B), and white (W). However, the colors having the plurality of pixels are not limited to the above example.

According to one embodiment, the plurality of pixels provided in the first region may be defined as a plurality of first pixels 701. In addition, a plurality of pixels provided in the second region may be defined as a plurality of second pixels 702.

Referring to FIGS. 7A and 7B, in the display according to the embodiment, the arrangement forms of the pixels 701 and 702 provided in each of the first and second regions may be different from each other. For example, the form in which the plurality of first pixels 701 are arranged and the form in which the plurality of second pixels 702 are arranged may be different from each other. For example, the plurality of first pixels 701 are arranged in a matrix form and the plurality of second pixels 702 are arranged may be in a zigzag form. For example, in the plurality of first pixels 701, a red color pixel (R), a green color pixel (G), and a blue color pixel (B) may be arranged in a straight form in a first direction (e.g., horizontal direction 711) and a second direction (e.g., vertical direction 712). Alternatively, in the plurality of first pixels 701, an R, a G, and a B may be arranged in a zigzag form in a first direction (e.g., horizontal direction 721) and a second direction (e.g., vertical direction 722).

In the electronic device 600 according to the embodiment, an interval d2 between the plurality of second pixels 702 is formed to be narrower than an interval d1 between the plurality of first pixels 701, such that the transmittance of the first region may be higher than that of the second region. For example, the maximum spacing distance d1 between first pixels 701 to each other in the first region may be larger than the maximum spacing distance d2 between second pixels 702 adjacent to each other in the second region. The maximum spacing distance between pixels adjacent to each other may mean the largest value among distances between a specific pixel and pixels adjacent to each other to the specific pixel.

As illustrated, in the electronic device according to an embodiment of the present disclosure, the form in which the pixels are arranged in the first region differs form the form in which the pixels are arranged in the second region, and the maximum spacing distance between pixels adjacent to each other is relatively larger in the first region. Accordingly, the transmittance of the first region is relatively increased, and therefore the performance of the fingerprint sensor may be improved.

Figure 8A:
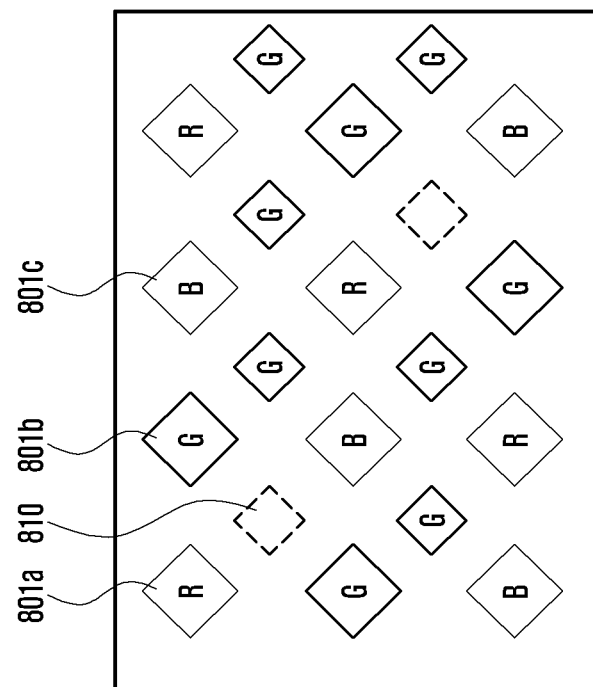
FIGS. 8A and 8B are plan views illustrating a pixel arrangement structure of a first region and a second region according to another embodiment of the present disclosure.
Figure 8B:
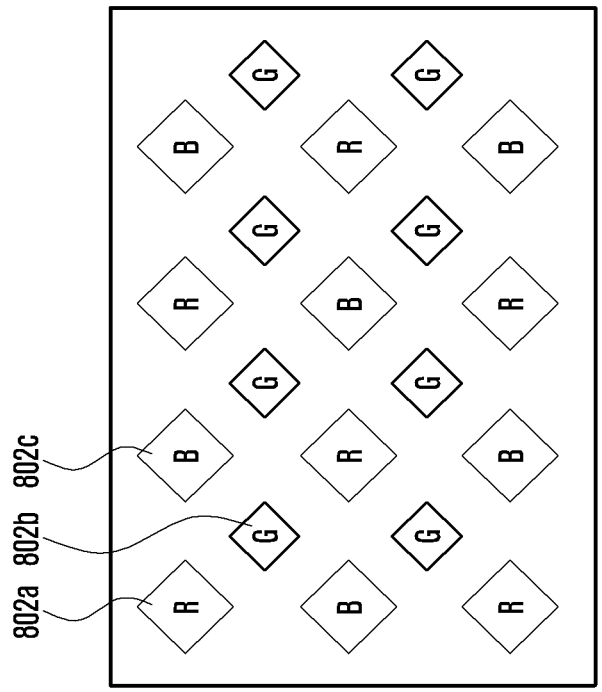

FIGS. 8A and 8B are plan views illustrating a pixel arrangement structure of a first region and a second region according to another embodiment of the present disclosure. FIG. 8A illustrates the pixel arrangement structure according to the first region, and FIG. 8B illustrates the pixel arrangement structure according to the second region.

Referring to FIGS. 8A and 8B, the display region of the display may include a plurality of first pixels 801a, 801b, and 801c, and second pixels 802a, 802b, and 802c. The plurality of first pixels 801a, 801b, and 801c, and second pixels 802a, 802b, and 802c may be configured to display a first color to a third color. Although not illustrated, the plurality of first pixels 801a, 801b, and 801c, and second pixels 802a, 802b, and 802c may be configured to display a first color to a fourth color. In the above description, the first to third colors may be red (R), green (G), and blue (B). Alternatively, in the above description, the first to fourth colors may be red (R), green (G), blue (B), and white (W). However, the colors having the plurality of pixels are not limited to the above example.

According to the embodiment, the plurality of pixels provided in the first region may be defined as a plurality of first pixels 801a, 801b, and 801c. In addition, a plurality of pixels provided in the second region may be defined as a plurality of second pixels 802a, 802b, and 802c. The plurality of first pixels 801a, 801b and 801c may include a pixel 801a displaying a red color, a pixel 801b displaying a green color, and a pixel 801c displaying a blue color. The plurality of second pixels 802a, 802b and 802c may include a pixel 802a displaying a red color, a pixel 801b displaying a green color, and a pixel 802c displaying a blue color.

Unlike the example illustrated in FIGS. 7A and 7B, in the example illustrated in FIGS. 8A and 8B, the arrangement forms of the plurality of pixels provided in the first and second regions may be the same. However, the plurality of first pixels 801a, 801b, and 801c may be fewer in number than the plurality of second pixels 802a, 802b, and 802c, or may have resolution lower than that of the plurality of second pixels 802a, 802b, and 802c.

For example, as illustrated, the plurality of first pixels 801a, 801b, and 801c and the plurality of second pixels 802a, 802b, and 802c have the same arrangement shape, but some regions of the first pixels 801a, 801b, and 801c may not be formed with pixels. For example, at least some region 810 of the plurality of first pixels 801a, 801b, and 801c is a region in which the pixel 801b displaying a specific color, for example, a green color needs to be formed according to an arrangement rule, but the corresponding region 810 may not be formed with pixels. Alternatively, at least some region 810 of the plurality of first pixels 801a, 801b, and 801c is a region which the pixel 810b displaying a green color needs to be formed while matching the pixel 801b displaying a green color that is provided in the second region, but the corresponding region 810 may be open without being formed with pixels.

In the electronic device 600 according to the embodiment, a part of a pixel representing a particular color in the first region may be deleted and the deleted region may be open. Therefore, the electronic device 600 according to the embodiment can increase the transmittance of the first region and improve the performance of the fingerprint sensor. In the electronic device 600 according to another embodiment, a transmitter (e.g., ultrasonic oscillator, infrared light emitting diode (IRLED), or the like) or a receiver (e.g., ultrasonic receiver or IRLED receiver) for biometric recognition may be included in the deleted region.

The electronic device 600 according to another embodiment may increase the transmittance of the first region without making a design to delete pixels in a specific region beyond the pixel arrangement rule. For example, the plurality of first specific pixels 801a, 801b, and 801c among the plurality of first pixels 801a, 801b, and 801c and the plurality of second pixels 802a, 802b, and 802c are arranged in the same form, but the interval between pixels adjacent to each other can be increased by reducing areas of each pixel. Therefore, the areas of each of the first pixel may be smaller than those of each of the second pixels.

Figure 9B:
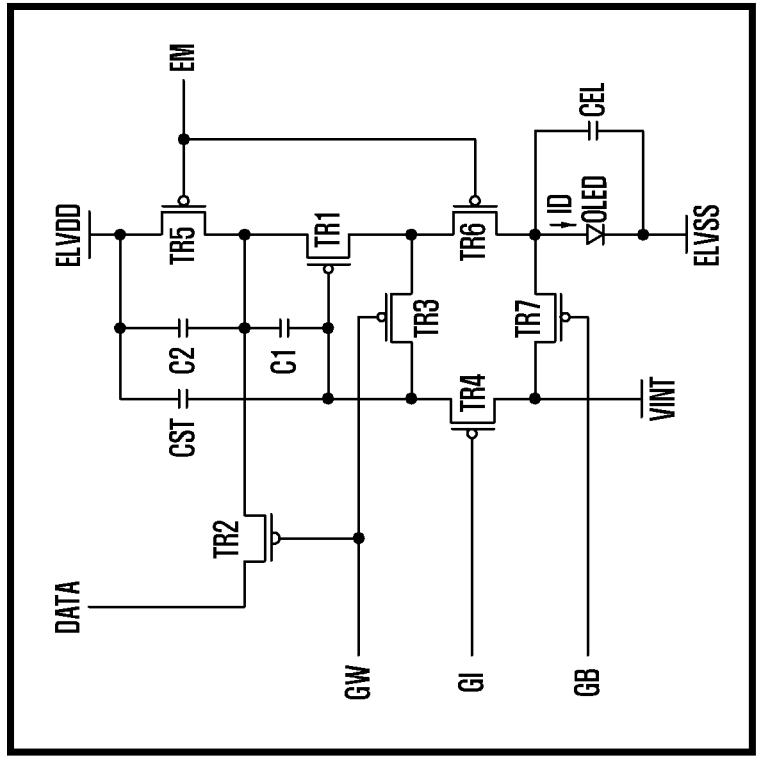
FIGS. 9A and 9B are plan views illustrating a pixel circuit structure of a first region and a second region according to an embodiment of the present disclosure.
Figure 9A:
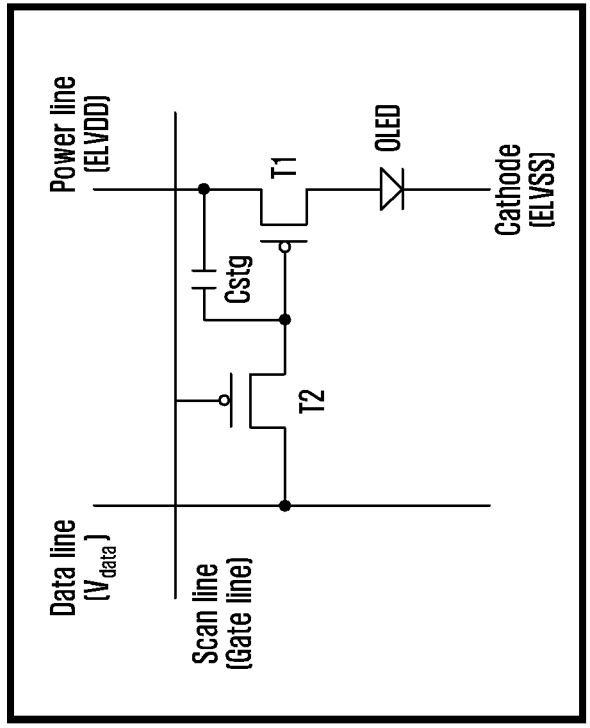

FIGS. 9A and 9B are plan views illustrating a pixel circuit structure of a first region and a second region according to an embodiment of the present disclosure. FIG. 9A illustrates the pixel circuit structure according to the first region, and FIG. 9B illustrates the pixel circuit structure according to the second region.

Referring to FIGS. 9A and 9B, in the electronic device 600 according to the embodiment, the circuit structures of the pixels configuring the first region and the second region of the display may be different from each other. The display may be configured as an OLED display. As illustrated, the OLED display may be configured so that each pixel includes at least one switching element (e.g., thin film transistor), at least one capacitor, and at least one OLED.

According to one embodiment, the pixels of the first region may include a smaller number of elements than the pixels of the second region. An element configuring each pixel, for example, a thin film transistor or a capacitor may be made of an opaque metal. Therefore, if the number of elements configuring each pixel is increased, the transmittance of the pixel may be reduced. In the electronic device 600 according to the embodiment, each pixel included in the first region is configured to include a smaller number of elements than each pixel included in the second region, thereby increasing the transmittance of the first region. For example, each of the first pixels may include a (a is an integer greater than or equal to 2) switching elements and b (b is an integer greater than or equal to 1) capacitors, and each of the second pixels may include c (c is an integer greater than or equal to a) switching elements and d (d is an integer greater than or equal to b) capacitors.

For example, referring to FIG. 8A, each of the first pixels may include two thin film transistors T1 and T2, one capacitor Cstg, and an OLED. Since the pixel structure of the OLED display illustrated in FIG. 8A is a basic pixel structure widely known to those skilled in the art, a detailed driving method thereof will be omitted. In addition, referring to FIG. 8B, each of the second pixels may include seven thin film transistors TR1 to TR7, one capacitor CST, and an OLED. The pixel structure of the OLED display illustrated in FIG. 8B is for improving the process variation of the thin film transistors TR1 to TR7 and the reaction speed of the pixels, and may be variously changed. However, since the pixel structure of the OLED display illustrated in FIG. 8B is disclosed in Korean Patent Laid-Open No. 10-2016-0024191, a detailed driving method thereof will be omitted. The pixel structure of the present disclosure is not limited to the example of FIGS. 8A and 8B and may be variously modified or changed.

Figure 10:
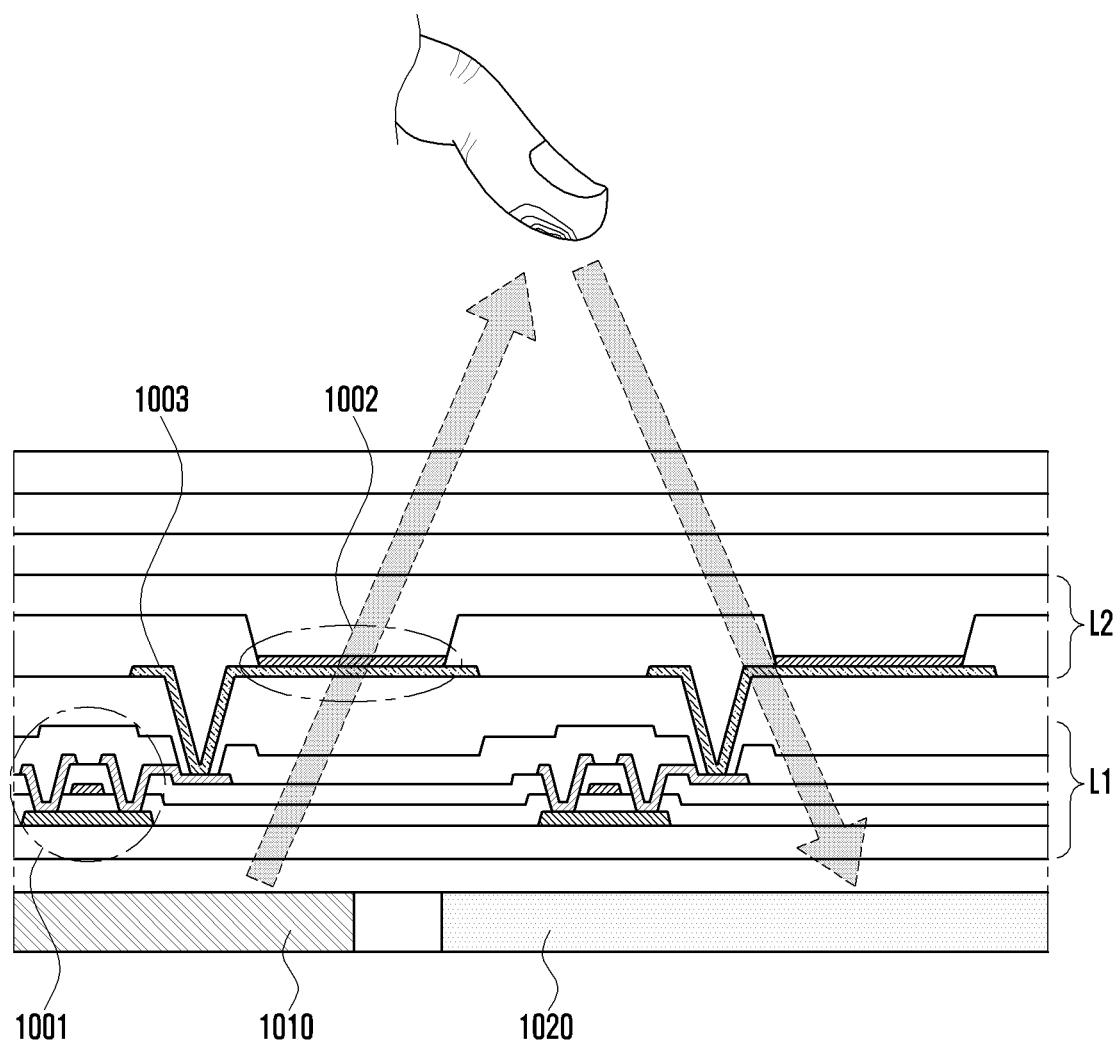
FIG. 10 is a diagram schematically illustrating a cross-sectional structure of a first region according to an embodiment of the present disclosure.

FIG. 10 is a diagram schematically illustrating a cross-sectional structure of a first region according to an embodiment of the present disclosure.

Referring to FIG. 10, the first region of the display may be sequentially laminated with a thin film transistor 1001 and an OLED 1002. The thin film transistor 1001 and the OLED 1002 may be connected to each other through a transparent electrode 1003. The thin film transistor 1001 may be any one of the plurality of thin film transistors illustrated in FIGS. 9A and 9B, for example, a driving thin film transistor T1 illustrated in FIGS. 9A and 9B.

According to one embodiment, the first region includes a first layer L1 on which the thin film transistor 1001 and the capacitor are formed, and a second layer L2 provided over the first layer L1 and formed with the OLED 1002.

According to one embodiment, fingerprint sensors may be disposed under the second layer L2. According to one embodiment, the fingerprint sensors include a light emitting element 1010 emitting light of a specific wavelength, and a light receiving element 1020 sensing light emitted from the light emitting element 1010 and reflected from a user's fingerprint. The light emitting element 1010 and the light receiving element 1020 may each be disposed under the second layer L2. For example, the light emitting element 1010 may be an LED element that emits infrared light. The light receiving element 1020 may be configured as a photodiode or a phototransistor configured to sense light having a specific wavelength.

Figure 11:
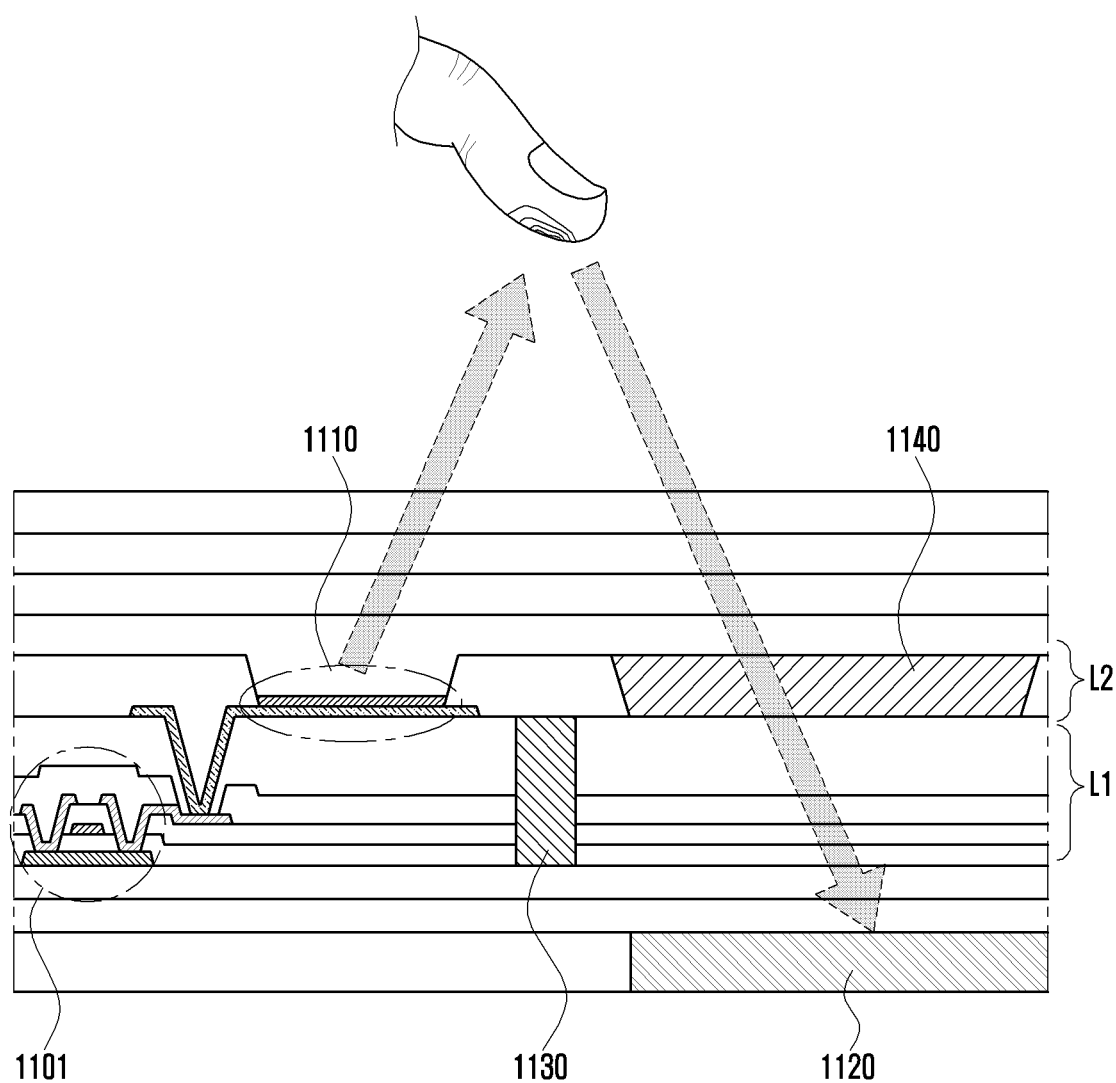
FIG. 11 is a diagram schematically illustrating a cross-sectional structure of a first region according to another embodiment of the present disclosure.

FIG. 11 is a diagram schematically illustrating a cross-sectional structure of a first region according to another embodiment of the present disclosure.

Referring to FIG. 11, at least some of the components of the fingerprint sensor may be formed on the same layer as the first layer L1 or the second layer L2. For example, the light emitting element 1110 may be configured as an organic light emitting element on the second layer L2. At least some of the organic light emitting elements configuring the light emitting element 1110 may be configured to emit invisible light. The invisible light may mean, for example, light having a wavelength band other than light in a visible region. For example, the invisible light may be light in the infrared region or light in the ultraviolet region. According to one embodiment, the light emitting element may output light having a specific wavelength, for example, green light.

In addition, a light receiving element 1120 may be disposed under the second layer L2, like the light receiving element 1020 illustrated in FIG. 10.

According to the embodiment, in the first region, at least one of the first and second layers L1 and L2 may be provided with a light shielding barrier 1130. The light shielding barrier 1130 may prevent light output from the light emitting element 1110 from being introduced into a thin film transistor 1101 due to the reflection. The light shielding barrier 1130 may be made of resin or metal capable of absorbing or reflecting light.

According to the embodiment, the second layer L2 may be provided with a light shielding filter 1140 that transmits only light having a specific wavelength. For example, the light shielding filter 1140 may transmit only the light having the wavelength band output from the light emitting element 1110. For example, if the light emitting element 1110 outputs green light, the light shielding filter 1140 may transmit green light and cut off light having another color or another wavelength band. According to one embodiment, the light shielding filter 1140 may be disposed to overlap with the light receiving element 1120. The light shielding filter 1140 may serve to filter remaining light so that only the light output from the light emitting element 1110 and reflected may be supplied to the light receiving element 1120.

Figure 12:
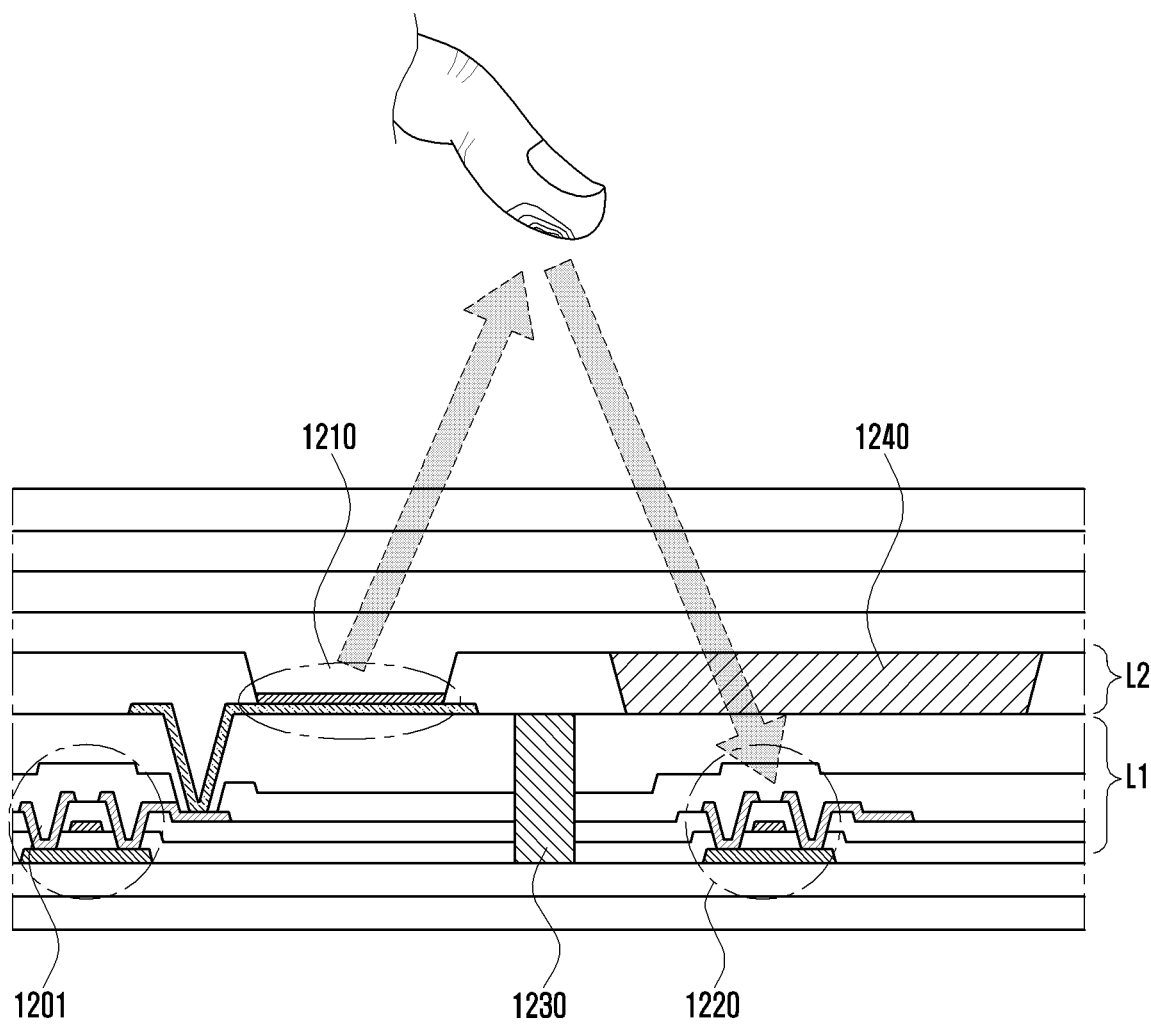
FIG. 12 is a modified example of the cross-sectional structure of the first region.

FIG. 12 is a modified example of the cross-sectional structure of the first region according to another embodiment of the present disclosure.

Referring to FIG. 12, in the electronic device according to another embodiment, the light receiving element 1220 may be formed on the same layer as the thin film transistor 1201, unlike the electronic device illustrated in FIG. 11. For example, the light receiving element 1220 may be formed on the first layer L1 on which the thin film transistor 1201 is formed. The light receiving element 1220 may be configured as a thin film transistor which is switched in response to light having a specific wavelength. A light shielding barrier 1230 may be formed between the light receiving element 1220 and the thin film transistor 1201 on the first layer L1. A light shielding filter 1240 may be formed over the light receiving element 1220. The light shielding filter 1240 may be formed on the second layer on which the light emitting element 1210 is formed.

Figure 13:
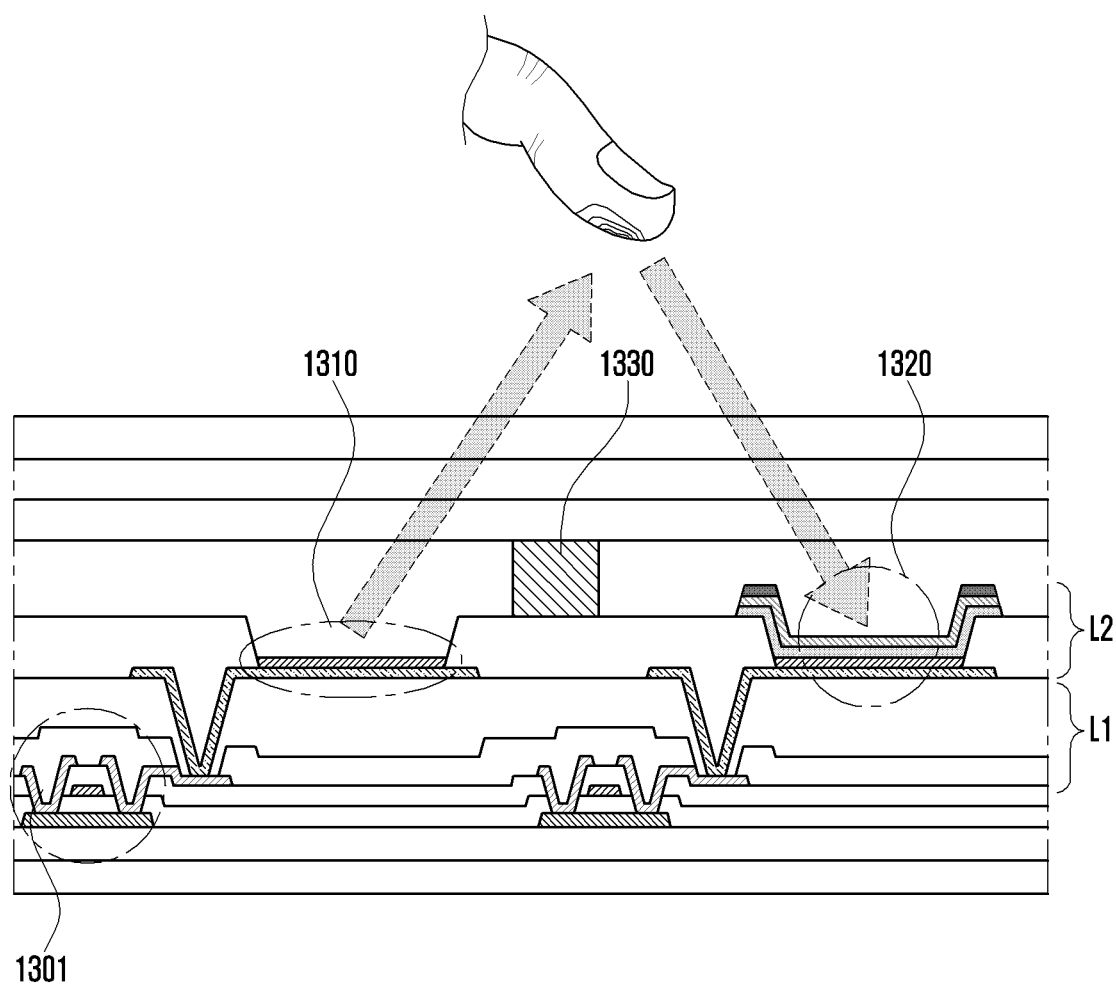
FIG. 13 is another modified example of the cross-sectional structure of the first region according to another embodiment of the present disclosure.

FIG. 13 is another modified example of the cross-sectional structure of the first region according to another embodiment of the present disclosure.

Referring to FIG. 13, in the electronic device according to various embodiments, a light receiving element 1320 may be formed on the same layer as the OLED, unlike the electronic device illustrated in FIG. 11. For example, the light receiving element 1320 may be formed on the second layer L2 on which the OLED and a light emitting element 1310 are formed. The light receiving element 1320 may be configured as an organic diode which is switched in response to light having a specific wavelength. A light shielding barrier 1330 may be formed on the second layer L2 between the light receiving element 1320 and the thin film transistor 1301.

Figure 14:
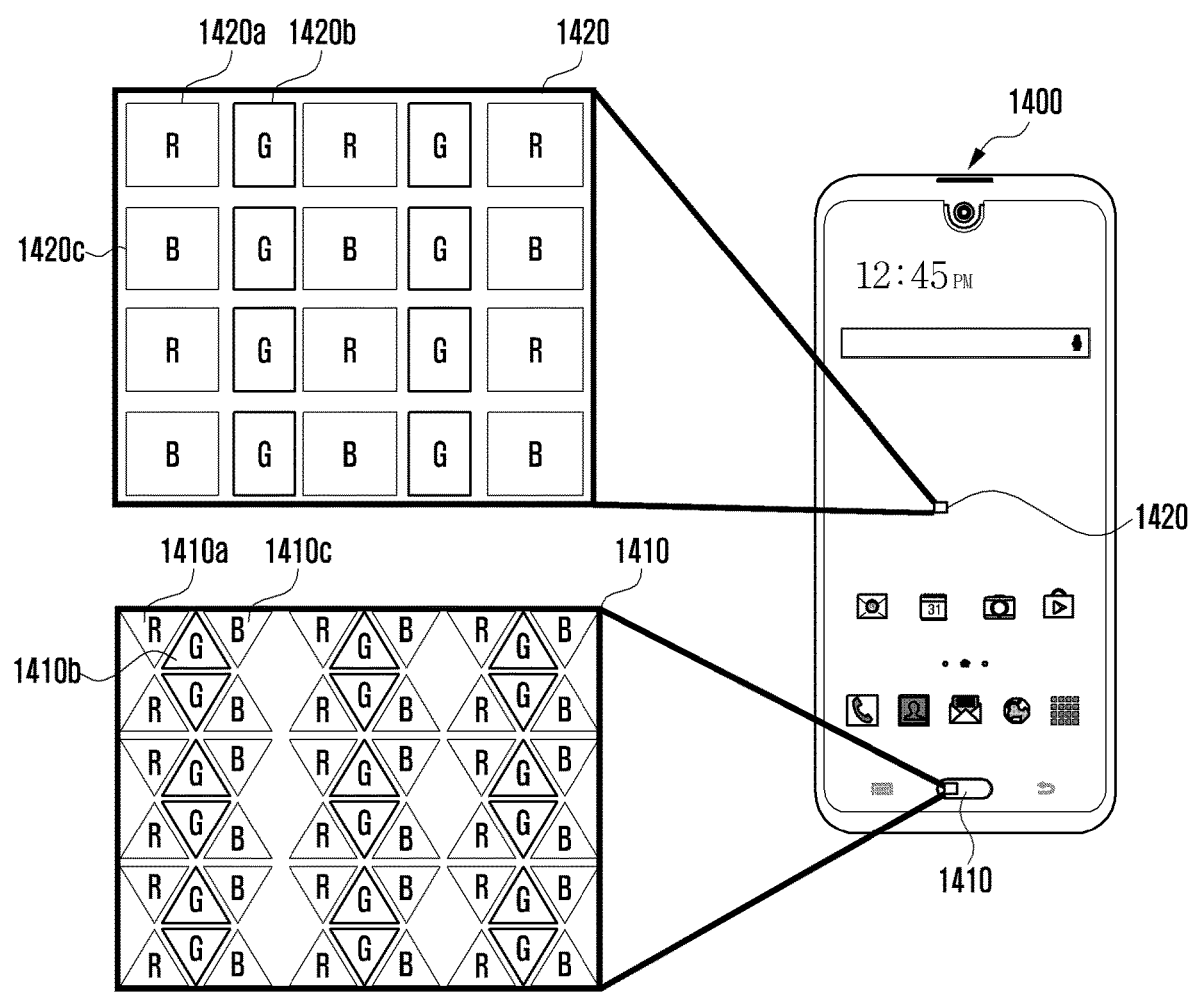
FIG. 14 is a diagram illustrating a pixel arrangement structure of a first region and a second region according to an embodiment of the present disclosure.

FIG. 14 is a diagram illustrating a pixel arrangement structure of a first region and a second region according to an embodiment of the present disclosure. For example, FIG. 14 may be an enlarged view of at least a part of a first region 1410 of an electronic device 1400 and at least a part of a second region 1420 of the electronic device 1400.

In FIG. 14, reference numerals 1410a, 1410b, 1410c, 1420a, 1420b, and 1420c may indicate the shape and area of the light emitting region (display region) of the corresponding pixel.

Referring to FIG. 14, the display region of the display may include a plurality of pixels. The plurality of pixels may be configured to display a first color to a third color or a first color to a fourth color. Although not illustrated, the plurality of pixels may be configured to display the first color to the fourth color. In the above description, the first to third colors may be red (R), green (G), and blue (B). Alternatively, in the above description, the first to fourth colors may be red (R), green (G), blue (B), and white (W). In the present disclosure, the colors having the plurality of pixels are not limited to the above example.

According to one embodiment, a plurality of pixels 1410a, 1410b, and 1410c provided in the first region 1410 may be defined as a plurality of first pixels 1420a, 1420b, and 1420c. In addition, a plurality of pixels provided in the second region may be defined as a plurality of second pixels 1420a, 1420b, and 1420c.

Referring to FIGS. 7A and 7B, in the display according to the embodiment, the arrangement forms of the pixels 1420 and 702 provided in each of the first and second regions may be different from each other. For example, the shapes of the plurality of first pixels 1410a, 1410b, and 1410c and the shapes of the plurality of second pixels 1420a, 1420b, and 1420c may be different from each other.

In the above description, the fact that the shapes of the pixels may be different may mean that the shapes of the light emitting regions (display regions) of the respective pixels arranged in the respective regions (first region 1410 or second region 1420) are different. For example, as illustrated in FIG. 14, the first pixels 1410a, 1410b, and 1410c disposed in the first region 1410 include a light emitting region having a rectangular shape, and the second pixels 1420a, 1420b, and 1420c disposed in the second region 1420 may include a light emitting region having a triangular shape.

Alternatively, in the above description, the fact that the shapes of the pixels are different may mean that the areas of the light emitting regions of the pixels displaying the same color in each region (first region 1410 or second region 1420) are different. For example, as illustrated in FIG. 14, the first pixel 1410a displaying a red (R) color among the first pixels 1410a, 1410b, and 1410c disposed in the first region 1410 is configured to include the light emitting region having the first area, whereas the second pixel 1420a displaying a red color among the second pixels 1420a, 1420b, and 1420c disposed in the second region 1420 is configured to include the light emitting region having the second area different from the first area.

Alternatively, in the above description, the fact that the shapes of the pixels are different may mean that the arrangement order between the pixels displaying different colors arranged in each region (first region 1410 or second region 1420) is different. For example, as illustrated in FIG. 14, in the first pixels 1410a, 1410b, and 1410c disposed in the first region 1410, a 3k-2 (k is an integer)-th column (e.g., first column) may be formed with a red pixel 1410a, a 3k-1 (e.g., second column)-th column may be formed with a green pixel 1410b, and a 3k-th column (e.g., third column) may be formed with a blue pixel 1410c. On the other hand, odd columns of the second pixels 1420a, 1420b, and 1420c disposed in the second region 1420 may be alternately formed with red and blue pixels 1420a and 1420c and even columns thereof may be formed with a green pixel 1420b.

Alternatively, in the above description, the fact that the shapes of the pixels are different may mean that the arrangement form of the pixels displaying the same color arranged in each region (first region 1410 or second region 1420) is different. For example, as illustrated in FIG. 14, in the first pixels 1410a, 1410b, and 1410c disposed in the first region 1410 the pixels having the same color may have the same arrangement form regardless of colors. For example, all of the second pixels 1420a having the red color among the second pixels 1420a, 1420b, and 1420c disposed in the second region 1410 are arranged in the same shape. On the other hand, the first pixels 1410a disposed in the first region 1410 may have different arrangement forms even if they are pixels of the same color. For example, the first pixels 1410a having the red color disposed in the first region 1410 may be arranged in an inverse triangle shape in an odd row, and may be arranged in a triangle shape in an even row so that they have a shape symmetrical to those in an odd row.

Figure 15:
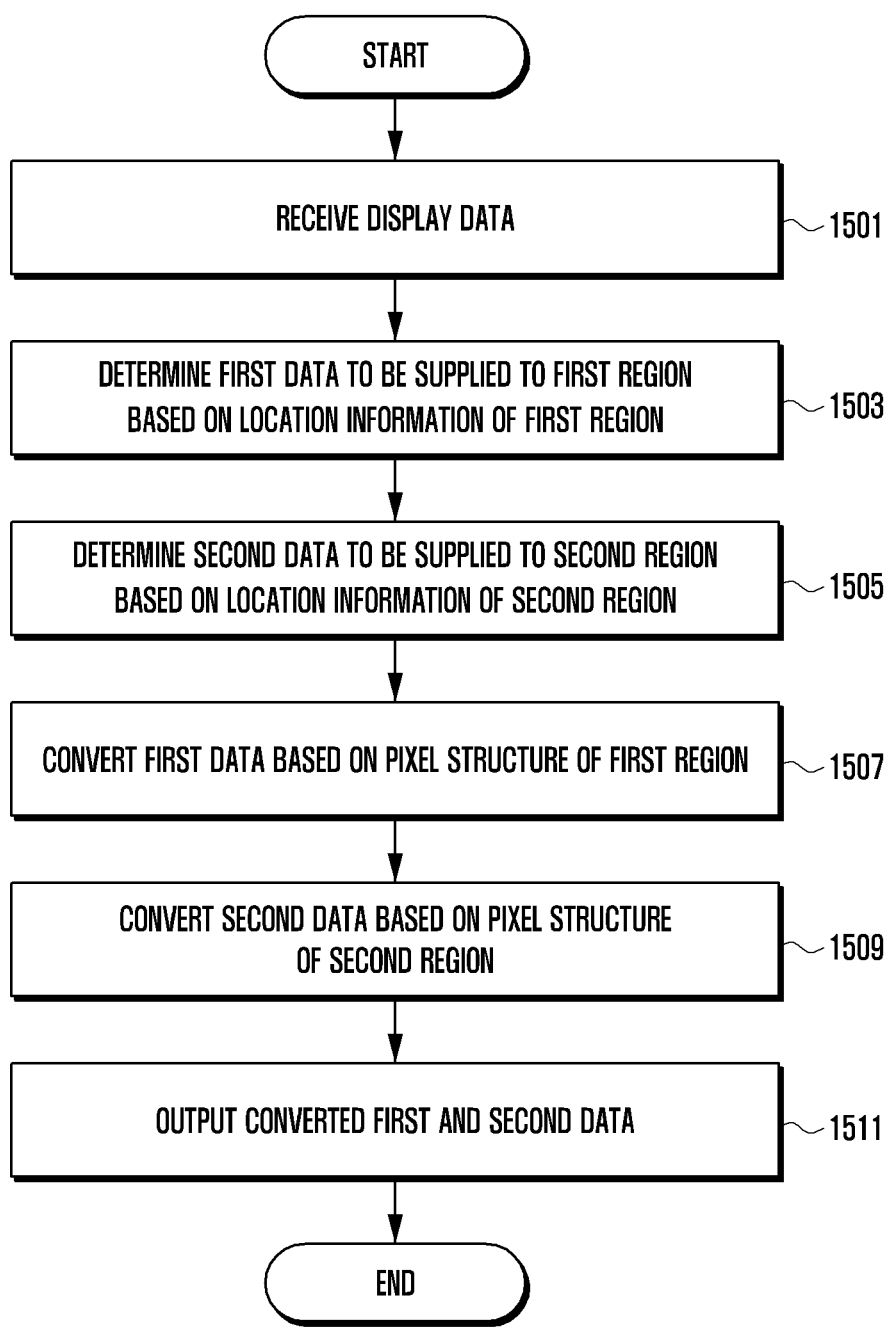
FIG. 15 is a flow chart of an operation of a display driver according to various embodiments of the present disclosure.

FIG. 15 is a flow chart of an operation of a display driver according to various embodiments of the present disclosure.

Referring to FIG. 15, a flow diagram of an operation of a mapping module configured in a display.

In operation 1501, the display driver 450 may receive a display data, i.e., an image data, from the AP or the LPP.

In operation 1503 and operation 1505, the display driver 450 matches the received image data for each region based on the positional information corresponding to the first region 442 and the second region 444 of the display, and may determine the image data as the first data or the second data based on the matched result. For example, the display driver 450 may determine, as a first data, data to be supplied to the first region 442 among the received image data, based on the positional information of the first region 442. Alternatively, the display driver 450 may determine, as a second data, data to be supplied to the second region 444 among the received image data, based on the positional information of the second region 444.

In operation 1507 and operation 1509, the display driver 450 may convert the determined first and second data according to the structure and driving characteristics of the corresponding region. As described above, according to various embodiments of the present disclosure, at least a part of the structure, form, shape, or arrangement structure of the pixels configuring the first region 442 and the second region 444 may be configured differently. Therefore, even if the same image data is applied, the first pixel arranged in the first region 442 and the second pixel arranged in the second region 444 may output light having different gradations, which may cause a luminance deviation and an image quality defect. Therefore, the display driver 450 of the present disclosure may perform image processing on the first data supplied to the first region 442 and the second data supplied to the second region 444 in order to prevent defects such as the luminance deviation.

For example, the display driver 450 may convert the first and second data based on the size of the first area of the light emitting region (display region) of the first pixel and the size of the second area of the light emitting region (display region) of the second pixel disposed in the second region 444. For example, the display driver 450 may generate the first converted data by giving a high weight to the first data because the light emitting region of the first pixel may have a relatively smaller area. Alternatively, the display driver 450 may generate the second converted data by giving a low weight to the second data because the light emitting region of the second pixel may have a relatively larger area. Various embodiments of the present disclosure may prevent the image quality defects such as the luminance deviation by converting the image data supplied to the corresponding region based on the structure and driving characteristics between the pixels disposed in the first and second regions 444.

Alternatively, the display driver 450 may convert the first and second data based on a first resolution of the first pixels configuring the first region 442 and a second resolution of the second pixels configuring the second region 444. For example, the display driver 450 may generate the first converted data by giving a high weight to the first data because the resolution of the first region 442 may be relatively low. Alternatively, the display driver 450 may generate the second converted data by giving a low weight to the second data because the resolution of the second region 444 may be relatively high.

In operation 1511, the display driver 450 may output the converted first and second data to a source driver.

Figure 16:
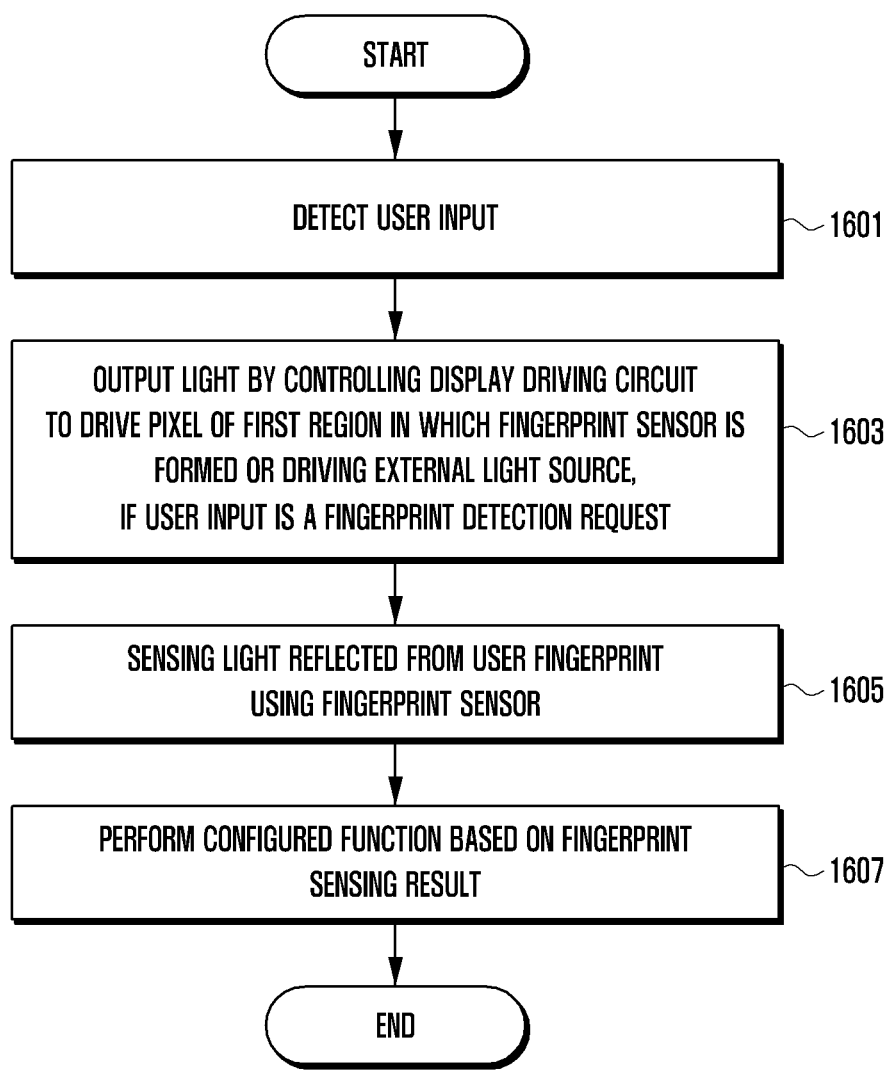
FIG. 16 is a flow chart of an operation of an electronic device according to various embodiments of the present disclosure.

FIG. 16 is a flow chart of an operation of an electronic device according to various embodiments of the present disclosure.

In operation 1601, the processor 430 may detect the user input. For example, the processor 430 may control the display to display the user interface requesting fingerprint authentication. For example, the processor 430 may execute a specific application and if the user authentication is required, request the fingerprint input to the user and provide the user interface describing the fingerprint input method. The processor 430 may receive a signal corresponding to the fingerprint input from the user through the user interface.

In operation 1603, if the user input is the fingerprint detection request, the processor 430 controls the display driving circuit to drive the pixels of the first region 442 in which the fingerprint sensor is formed or may drive an external light source to output light. For example, the processor 430 may determine whether the user input is the fingerprint input. The processor 430 may output light to the first region 442 for the fingerprint sensing if the received user input is the fingerprint detection request, that is, the user receives the signal generated by inputting a fingerprint to the first region 442. For example, the processor 430 may control the display driving circuit to output light through the pixel corresponding to the first region 442. Alternatively, the processor 430 may output an infrared light by controlling a light source device that is separate from the display, for example, a light source device that outputs infrared light. The light output through the first region 442 of the display or the light emitted from the light source device may be reflected from the user's fingerprint and supplied to the light receiver of the fingerprint sensor.

In operation 1605 and operation 1607, the processor 430 may sense the light reflected from the user's fingerprint by the fingerprint sensor, and perform the set function based on the fingerprint sensing result. For example, the processor 430 may transmit information obtained from the fingerprint sensor to the processing module, the AP, and the LLP, and may receive an instruction word from the processing module, the AP, and the LLP to perform the functions according to the fingerprint sensing result.

According to various embodiments of the present disclosure, it is possible to meet the needs of users who want to have the larger screen region (display region) of the display by allowing the biometric sensor to be arranged to correspond to the screen region of the display.

A programming module according to embodiments of the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

The above-described embodiments of the present disclosure can be implemented in hardware, firmware or via the execution of software or computer code that can be stored in a recording medium such as a CD ROM, a DVD, a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., random access memory (RAM), read only memory (ROM), Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and detail may be made therein without departing from the spirit and scope of the present disclosure as defined by the appended claims.

What is claimed is:

1. An electronic device comprising:
a display including a first region that includes a plurality of pixels and a second region that includes a plurality of pixels;
a sensor disposed below the plurality of pixels in the first region, the sensor being able to sense light entered from outside of the electronic device; and
a processor configured to:
receive a user input through the display, and
control the sensor to sense light according to the user input,
wherein the number of components, formed in the first region of the display, associated with each one of the plurality of pixels in the first region is smaller than the number of components formed in the second region of the display, associated with each one of the plurality of pixels in the second region.

2. The electronic device of claim 1, wherein the plurality of pixels in the first region have a first shape and the plurality of pixels in the second region have a second shape.

3. The electronic device of claim 2,
wherein the plurality of pixels in the first region is arranged in a matrix form, and
wherein the plurality of pixels in the second region is arranged in a zigzag form.

4. The electronic device of claim 1, wherein a maximum spacing distance between adjacent pixels of the plurality of pixels in the first region is larger than a maximum spacing distance between adjacent pixels of the plurality of pixels in the second region.

5. The electronic device of claim 1,
wherein the plurality of pixels in the first region and the plurality of pixels in the second region have same structure and shape, and
wherein the plurality of pixels in the first region have a resolution lower than that of the plurality of pixels in the second region.

6. The electronic device of claim 5, wherein the plurality of pixels in the first region have a smaller number of pixels for displaying a specific color than the plurality of pixels in the second region.

7. The electronic device of claim 1,
wherein each of the plurality of pixels in the first region includes a switching transistors and b capacitors,
wherein each of the plurality of pixels in the second region includes c switching transistors and d capacitors, and
wherein a is an integer greater than or equal to two, b is an integer greater than or equal to one, c is an integer greater than a, and d is an integer greater than or equal to b.

8. The electronic device of claim 1,
wherein the first region includes a first layer on which at least one switching transistor and at least one capacitor are formed and a second layer disposed over the first layer and having an organic light emitting diode disposed thereon, and
wherein the sensor includes a light emitting circuit and a light receiving circuit positioned on same layer as or different layers from the first and second layers.

9. The electronic device of claim 8, wherein the light emitting circuit and the light receiving circuit are disposed under the first layer.

10. The electronic device of claim 9, wherein the light receiving circuit is configured as a diode or a light receiving type transistor on the second layer.

11. The electronic device of claim 8, wherein the light emitting circuit is configured as the organic light emitting diode on the second layer.

12. The electronic device of claim 11, wherein the organic light emitting diode is configured to emit infrared light.

13. The electronic device of claim 8, further comprising a light shielding barrier formed in at least one of the first and second layers.

14. The electronic device of claim 8, further comprising a light shielding filter formed in the second layer, and configured to transmit only light of a specific wavelength.

15. The electronic device of claim 14, wherein the light shielding filter transmits only light having a wavelength band output from the light emitting circuit.

16. The electronic device of claim 1, wherein the components formed in the first or second region of the display and associated with each one of the plurality of pixels comprise at least one of a transistor, a capacitor, an electrical wire, or a resistor.

17. The electronic device of claim 1, wherein the sensor comprises at least one of a fingerprint sensor, an image sensor, or an illuminance sensor.

18. The electronic device of claim 1, wherein a size of each one of the plurality of pixels in the first region is greater than a size of each one of the plurality of pixels in the second region.

* * * * *